United States Patent
Ohsaki et al.

(10) Patent No.: US 8,564,972 B2
(45) Date of Patent: Oct. 22, 2013

(54) INVERTER CONTROL DEVICE AND METHOD WITH MULTIPLE SWITCHING CIRCUIT CONTROL METHODS

(75) Inventors: Norikazu Ohsaki, Nara (JP); Yoshiaki Tanaka, Osaka (JP); Yoshiyuki Tabata, Hyogo (JP)

(73) Assignee: Panasonic Corporation, Osaka (JP)

( * ) Notice: Subject to any disclaimer, the term of this patent is extended or adjusted under 35 U.S.C. 154(b) by 158 days.

(21) Appl. No.: 13/061,608

(22) PCT Filed: May 24, 2010

(86) PCT No.: PCT/JP2010/003458
§ 371 (c)(1),
(2), (4) Date: Mar. 1, 2011

(87) PCT Pub. No.: WO2010/137278
PCT Pub. Date: Dec. 2, 2010

(65) Prior Publication Data
US 2012/0120687 A1  May 17, 2012

(30) Foreign Application Priority Data
May 27, 2009  (JP) ................................. 2009-127359

(51) Int. Cl.
H02M 3/335 (2006.01)
(52) U.S. Cl.
USPC ............................................. 363/17; 363/98

(58) Field of Classification Search
USPC ............................................... 363/17, 98, 132
See application file for complete search history.

(56) References Cited

U.S. PATENT DOCUMENTS

| 6,185,111 B1* | 2/2001 | Yoshida ........................... 363/17 |
| 8,385,085 B2* | 2/2013 | Hattori et al. .................... 363/17 |
| 2012/0120687 A1* | 5/2012 | Ohsaki et al. ............... 363/21.09 |

FOREIGN PATENT DOCUMENTS

| JP | 2002-34238 A | 1/2002 |
| JP | 2003-18857 A | 1/2003 |
| JP | 2004-322189 A | 11/2004 |

OTHER PUBLICATIONS

International Search Report for PCT/JP2010/003458, Aug. 24, 2010, Panasonic Corporation.

* cited by examiner

Primary Examiner — Jeffrey Sterrett
(74) Attorney, Agent, or Firm — RatnerPrestia

(57) ABSTRACT

An inverter control device drives one of the two switching circuits with a fixed conduction width and changes the control method of the other switching circuit between pulse-width modulation, phase control method, and drive signal width control method by phase control method according to an output state, to implement highly accurate control at low output while suppressing heat generation of a switching element.

11 Claims, 28 Drawing Sheets

INVERTER CONTROL DEVICE AND METHOD WITH MULTIPLE SWITCHING CIRCUIT CONTROL METHODS

THIS APPLICATION IS A U.S. NATIONAL PHASE APPLICATION OF PCT INTERNATIONAL APPLICATION No. PCT/JP2010/003458.

TECHNICAL FIELD

The present invention relates to an inverter control device, particularly to a device for controlling an inverter circuit for controlling welding output power used in a welding machine that processes a processed object by arc discharge, and to a method of controlling the circuit.

BACKGROUND ART

A device (e.g. welding machine) that discharges arc between an electrode and a processed object (referred to as parent material, hereinafter) to melt the parent material for processing typically includes a power control circuit for controlling an output current flowing between the electrode and the parent material or output voltage applied between them.

In recent years, such a power control circuit has been usually formed of an inverter circuit including a high-speed switching element and a power conversion transformer, becoming widely used as an inverter-controlled welding machine.

Such an inverter-controlled welding machine typically includes a full-bridge inverter circuit. The welding machine drives a power semiconductor element (e.g. IGBT and MOSFET) composing a bridge circuit, at an inverter frequency (usually from several kHz to approximately 100 kHz). Simultaneously, the welding machine compares an output current to an output current set value (or output voltage to an output voltage set value) to control conduction time of the power conversion transformer, thereby obtaining output with current or voltage characteristics preferable for welding output power.

As full-bridge inverter control method, some conventional inverter-controlled welding machines use pulse-width modulation (referred to as PWM hereinafter), which controls conduction time of a switching element. Others use phase control method (also referred to as phase shift method), which controls conduction timing of a switching element (refer to patent literature 1).

Further, others can use a method in which features of PWM and phase control method are merged; one bridge circuit out of the two is controlled with a fixed conduction width; and the other undergoes pulse-width modulation (referred to as one-side bridge fixed conduction width PWM control, hereinafter).

Hereinafter, a description is made of welding machines by the three methods: PWM, phase control, and one-side bridge fixed conduction width PWM control.

First, PWM above is described using FIG. 11.

FIG. 11 shows an outline structure of substantial parts of an arc welding machine including an inverter control circuit by conventional PWM.

In FIG. 11, first rectifier 5 rectifies three- or single-phase AC input. First switching element 1 and second switching element 2 convert output from first rectifier 5 to an alternating current. Second rectifier 7 rectifies output from power conversion transformer 6. Output current detector 8 detects an output current. Current detecting part 9 converts a signal from output current detector 8 to a feedback signal. Output power setting part 12 is provided to preliminarily set average and effective values during a predetermined period, of a welding current or welding voltage as output from the welding machine. Error amplification part 11 determines an error between a signal output from current detecting part 9 and a signal set by output power setting part 12, and amplifies the error. Inverter driving basic pulse generating part 13 generates a driving waveform fundamental for inverter control. Pulse-width modulating part (PWM part, hereinafter) 14 outputs a control signal for controlling conduction widths of switching elements 1 and 2 according to an error amplification signal from error amplification part 11. Driving circuits 21, 22, 23, and 24 convert the control signal to a drive signal for driving switching elements 1 and 2 according to a signal output from pulse-width modulating part 14, and outputs the drive signal. Here, inverter control part 29 enclosed by the dashed-dotted line includes inverter driving basic pulse generating part 13 and pulse-width modulating part 14.

To control output power of a non-consumable electrode arc welding machine (e.g. TIG welding machine), current control is usually performed in which an output current is made equal to a current set value. To control output power of a consumable electrode arc welding machine (e.g. MAG welding machine), meanwhile, voltage control is performed in which output voltage is made equal to a voltage set value. The operation principles of an inverter used for output control of the above-described arc welding machines are the same, and thus a description is made of current control (controlled for a constant current value) as an operation example of an inverter.

Three- or single-phase AC input rectified by first rectifier 5 is converted to an alternating current with a high frequency by a full-bridge inverter circuit composed of switching elements 1, 2, 3, and 4, and then is input to the primary side of transformer 6. Here, switching elements 1 and 2 compose first switching circuit 25, and switching elements 3 and 4 compose second switching circuit 26. The secondary-side output of transformer 6 is rectified by second rectifier 7 and is supplied to an electrode and parent material (both are arc loads, not shown) through output terminals 38 and 39.

An output current from the welding machine is detected by output current detector 8, and a detection signal proportional to the output current is input to error amplification part 11 from output current detector 8 through current detecting part 9. Error amplification part 11 compares an output power set value from output power setting part 12 to a current signal from current detecting part 9, and outputs an error amplification signal between both. The error amplification signal is converted by pulse-width modulating part 14 to driving pulses with a width corresponding to the magnitude of the error amplification signal on a basis of a basic pulse waveform for inverter driving generated by inverter driving basic pulse generating part 13.

The driving pulses are separated one by one alternately into two series to become 2-series drive signals for inverter driving. One series is input to driving circuits 21 and 24 as a signal for driving switching elements 1 and 4 simultaneously; the other is input to driving circuits 22 and 23 as a signal for driving switching elements 2 and 3 simultaneously.

These drive signals are converted to those suitable for driving switching elements 1 to 4 by respective driving circuits 21 to 24, and are input to switching elements 1 to element 4.

As a result that switching elements 1 and 4; and switching elements 2 and 3 simultaneously conduct alternately, output from first rectifier 5 is converted to an alternating current. The alternating current is input to the primary winding of transformer 6; converted to output power suitable for welding; and output from the secondary winding of transformer 6. Output from the secondary winding of transformer 6 is converted to a direct current by second rectifier 7 and is output from the welding machine as welding output power.

Here, error amplification part 11 has an amplification factor as high as 100 times to 1,000 times for example. This allows maintaining constant current characteristics according to an output current set value even for a change in output voltage due to a change in load condition of output.

A description is made of an operation example of a welding machine by PWM later using FIG. 14.

Next, a description is made of the above welding machine by phase control method using FIG. 12.

FIG. 12 shows an outline structure of substantial parts of an arc welding machine including an inverter control circuit by conventional phase control method. In the following drawings, the same component is given the same reference mark, and its description may be omitted.

In FIG. 12, phase control part 15 outputs a control signal for controlling conduction of switching elements 1 to 4 according to an error amplification signal from error amplification part 11.

Three- or single-phase AC input rectified by first rectifier 5 is converted to an alternating current with a high frequency by a full-bridge inverter circuit composed of switching elements 1, 2, 3, and 4, and then is input to the primary side of transformer through capacitor 10. The secondary-side output of transformer 6 is rectified by second rectifier 7 and is supplied to an electrode and parent material (both are arc loads, not shown) through output terminals 38 and 39.

An output current from the welding machine is detected by output current detector 8, and a detection signal proportional to the output current is input to error amplification part 11 from output current detector 8 through current detecting part 9. Error amplification part 11 compares an output power set value from output power setting part 12 to a signal from current detecting part 9, and outputs an error amplification signal between both. The error amplification signal is converted by phase control part 15 to driving pulses with a phase difference corresponding to the level (magnitude) of the error amplification signal on a basis of a basic pulse waveform for inverter driving generated by inverter driving basic pulse generating part 13.

Inverter driving basic pulse generating part 13 outputs inverter driving basic pulse for driving first switching element 1 and second switching element 2 composing first switching circuit 25 alternately with a fixed conduction width. Here, first switching circuit control part 27 has inverter driving basic pulse generating part 13 to control first driving circuit 21 and second driving circuit 22. Second switching circuit control part 28 has phase control part 15 to control third driving circuit 23 and fourth driving circuit 24. The inverter driving basic pulses are converted to a signal suitable for driving switching elements 1 and 2 by driving circuits 21 and 22, and is input to switching elements 1 and 2.

A phase control signal generated by phase control part 15 works for outputting driving pulses for alternately driving third switching element 3 and fourth switching element 4 composing second switching circuit 26 with a phase difference corresponding to an error amplification signal in relation to operation of first switching circuit 25. These drive pulses are converted to a signal suitable for driving switching elements 3 and 4 by driving circuits 23 and 24 and are input to switching elements 3 and 4.

Then, during a period when a conduction period of switching element 1 coincides with that of switching element 4, a primary current flows through transformer 6 from first switching element 1 to fourth switching element 4. Meanwhile, during a period when a conduction period of switching element 2 coincides with that of switching element 3, a primary current flows through transformer 6 from third switching element 3 to second switching element 2. In this way, output from first rectifier 5 is converted to an alternating current; is converted to output power suitable for welding; and is output from the secondary winding of transformer 6. Output from the secondary winding of transformer 6 is converted to a direct current by second rectifier 7 and is output from the welding machine as welding output power.

Here, error amplification part 11 has an amplification factor as high as 100 times to 1,000 times, which allows maintaining constant current characteristics corresponding to an output current set value even for a change in output voltage due to a change in load condition of output.

An operation example of a welding machine by phase control method is described later using FIG. 15.

Next, a description is made of the above welding machine by one-side bridge fixed conduction width PWM control method using FIG. 13.

FIG. 13 shows an outline structure of substantial parts of an arc welding machine including an inverter control circuit by conventional one-side bridge fixed conduction width PWM control method.

FIG. 13 shows the configuration of FIG. 12 in which PWM part 14 is substituted for phase control part 15. Hereinafter, the operation is described.

Inverter driving basic pulse generating part 13 outputs inverter driving basic pulses for driving first switching element 1 and second switching element 2 composing first switching circuit 25 alternately with a fixed conduction width. The inverter driving basic pulses are converted to a signal suitable for driving switching elements 1 and 2 by driving circuits 21 and 22, and the signal is input to switching elements 1 and 2.

The error amplification signal input from error amplification part 11 is converted by PWM part 14 to driving pulses with a width corresponding to the level (magnitude) of the error amplification signal on a basis of a basic pulse waveform for inverter driving generated by inverter driving basic pulse generating part 13. The driving pulses are input one by one alternately to driving circuits 23 and 24 as a signal for driving third switching element 3 and fourth switching element 4.

Then, during a period when a conduction period of switching element 1 coincides with that of switching element 4, a primary current flows through transformer 6 from first switching element 1 to fourth switching element 4. Meanwhile, during a period when a conduction period of switching element 2 coincides with that of switching element 3, a primary current flows through transformer 6 from first switching element 3 to second switching element 2. In this way, output from first rectifier 5 is converted to an alternating current; is converted to output power suitable for welding; and is output from the secondary winding of transformer 6. Output from the secondary winding of transformer 6 is converted to a direct current by second rectifier 7 and is output from the welding machine as welding output power.

An operation example of the above welding machine by one-side bridge fixed conduction width PWM control method is described later using FIGS. 16A through 16C.

Next, a description is made of the above welding machine that exercises control by the three types of methods using FIGS. 14A through 14C, 15A through 15C, and 16A through 16C.

FIGS. 14A through 16C are schematic diagrams showing operation of an inverter of an arc welding machine including a conventional inverter control circuit. FIGS. 14A through 14C show operation by PWM method; FIGS. 15A through 15C, by phase control method; and FIGS. 16A through 16C, by one-side bridge fixed conduction width PWM control method.

FIGS. 14A, 15A, and 16A show operation states at low output (i.e. short inverter conduction period); FIGS. 14B, 15B, and 16B, at middle output (i.e. middle-range inverter conduction period); and FIGS. 14C, 15C, and 16C, at high output (i.e. long inverter conduction period). FIGS. 14A through 16C schematically show conduction states of first switching element 1 through fourth switching element 4, conduction periods of the inverter circuit; and waveforms of a primary current through transformer 6.

In FIGS. 14A through 16C, a part indicated by an arrow, of an operation waveform of first switching element 1 to fourth switching element 4 shows how the waveform changes during output control. An arrow appended at the falling edge of a waveform shows that the edge moves back and forth, and the waveform expands and contracts to change the conduction period. An arrow appended at the top of a waveform shows that the waveform does not expand or contract, the conduction period does not change, and the entire waveform moves back and forth on along the time axis. This indicates that the phase of a waveform changes to control output as shown by the inverter conduction period. A horizontally striped part of the waveform of a primary current through a transformer represents a regenerative current.

First, a description is made of an operation example of a welding machine by PWM method using FIGS. 14A through 14C. FIG. 14A shows operation at low output, where the switching element does not conduct (a transformer current is not flowing) due to such as delay operation (described later) of the driving circuit during minimum power output. FIG. 14B shows an operation example at middle output; and FIG. 14C, at high output. Both first switching circuit 25 and second switching circuit 26 are operating with PWM method.

Here, a description is made of the following situation using FIGS. 10A and 10B. That is, a switching element does not conduct due to such as delay operation of the driving circuit during minimum power output; a transformer current does not flow; and a transformer current becomes unstable near the minimum conduction width.

FIGS. 10A and 10B are schematic diagrams showing waveforms at some points of a switching element and a driving circuit, particularly for a combination of switching element 3 and driving circuit 23 out of the four switching elements and four driving circuits shown in FIG. 11. FIG. 10A shows an outline structure of driving circuit 23 using pulse transformer 31. FIG. 10B shows current waveforms at points A through C shown in FIG. 10A.

Driving circuit 23 shown in FIG. 10A is one including third switching element 3, inverter control part 29, pulse transformer operating transistor 30, pulse transformer 31, gate resistance 32, and capacitance 33 inside the gate of third switching element 3.

According to FIG. 10A, a drive signal output from inverter control part 29 is delayed at transistor 30 and pulse transformer 31 composing above-described driving circuit 23. Therewith, the signal is deformed by gate resistance 32 and capacitance 33 inside the gate of third switching element 3. In other words, as shown in FIG. 10B, the waveform at point A enters a state of delayed and reduced conduction time at point C where operation of third switching element 3 is shown. Accordingly, conduction (i.e. a flow of a transformer current) becomes unstable when the conduction time approaches the minimum conduction width, which sometimes causes a transformer current not to flow.

Next, a description is made of an operation example of a welding machine by phase control method using FIGS. 15A through 15C. FIGS. 15A through 15C show operation examples of an arc welding machine including an inverter control circuit by conventional phase control method. In all the areas of FIGS. 15A, 15B, and 15C, first switching circuit 25 shown in FIG. 12 is operating with a predetermined conduction width, and second switching circuit 26 is operating while undergoing phase control on first switching circuit 25. When second switching circuit 26 becomes nonconducting in this situation, a transformer current ceases to flow. Consequently, second switching circuit 26 interrupts a transformer current and first switching circuit 25 does not, thereby preventing heat generation caused by switching.

However, the large area size of the waveform indicated by the horizontal stripes in the waveform of a transformer current brings about a large regenerative current, thereby causing the regeneration diode of the switching element to generate more heat.

Here, a description is made of a regenerative current in phase control method using FIGS. 8A and 8B.

FIGS. 8A and 8B show changes in operating state of the inverter of a welding machine according to conventional phase control method. FIG. 8A shows the entire waveform for one cycle. FIG. 8B shows a conduction state of the switching element and a circuit current for periods indicated by T1 through T5 in FIG. 8A.

In FIG. 8A, L1 (the part surrounded by the oval solid line) indicates that switching loss is generated; L2 (the part surrounded by the oval broken line), is not generated. According to FIG. 8A, first switching element 1 indicated by Q1 does not interrupt a transformer current, and thus a conventional turn-off power loss is not generated. As indicated by T3 in FIG. 8B, however, first switching element 1 (indicated by Q1) and third switching element 3 (indicated by Q3) are in a conduction state for a long time, which causes a regenerative current to flow for a long time. Since this regenerative current is interrupted, a regeneration turn-off power loss is generated.

Next, a description is made of an operation example of a welding machine by one-side bridge fixed conduction width PWM control method using FIGS. 16A through 16C.

FIGS. 16A through 16C show operation examples of an arc welding machine including inverter control part 29 by conventional pulse-width modulation with one-side bridge fixed conduction width. FIG. 16A shows operation at low output, where the third and fourth switching elements do not conduct (a transformer current is not flowing) due to delay operation of the driving circuit during minimum power output. FIG. 16B shows operation at middle output; and FIG. 16C, at high output. Second switching circuit 26 shown in FIG. 13 is operating with PWM method in relation to first switching circuit 25. At this moment, second switching circuit 26 interrupts a transformer current and first switching circuit 25 does not interrupt, thereby preventing heat generation caused by switching.

Here, a description is made of the path of a charging current for a capacitor of a snubber in one-side fixed conduction width PWM method.

FIGS. 9A and 9B schematically show a charging current path of a snubber capacitor for a switching element, near a minimum transformer current. FIG. 9A shows operation of phase control method; and FIG. 9B, of one-side fixed conduction width PWM method.

In FIG. 9A, first switching element 1 and third switching element 3 are in a conduction state near a minimum current by phase control method. Accordingly, a charging current to second snubber capacitor 36 flows from first rectifier 5 to second snubber capacitor 36 through first switching element 1. A charging current to fourth snubber capacitor 37 flows from first rectifier 5 to fourth snubber capacitor 37 through third switching element 3. Accordingly, voltages at both ends of transformer 6 become nearly equal, and thus a charging current does not flow through transformer 6. Here, second snubber resistance 34 and fourth snubber resistance 35 are connected in parallel with transformer 6 placed therebetween.

In FIG. 9B, meanwhile, only first switching element 1 becomes in a conduction state near a minimum current by one-side fixed conduction width PWM method. Accordingly, both charging currents to second snubber capacitor 36 and fourth snubber capacitor 37 flow through first switching element 1, which causes the charging currents to flow through transformer 6. A current flowing through transformer 6 thus causes unintended output at the secondary side of transformer 6.

The above-described pulse-width modulation is performed in an inverter-controlled welding machine by conventional PWM method and by one-side bridge fixed conduction width pulse-width modulation. An attempt to exercise control with an inverter conduction width of a minute (approximately 1 μs) pulse width causes delay time in the drive path between inverter control part 29 and a switching element, particularly, delay time in the driving circuit and operation delay time in the switching element. Consequently, the switching element cannot be driven, or highly accurate control cannot be exercised in practice.

At this point, as shown in FIGS. 10A and 10B, a drive waveform signal output from inverter control part 29 activates switching element 3 through points A and B shown in FIG. 10A. On this occasion, however, the waveform at each point is deformed as shown in FIG. 10B due to delay operation in circuit components of driving circuit 23 and gate input capacitance 33 of third switching element 3. As shown in FIG. 10B, the conduction waveform of third switching element 3 at point C is not only delayed but is shortened in conduction width compared to the waveform at point A. Then, as shown in FIG. 10C, switching element 3 ceases to conduct as the drive signal width from inverter control part 29 becomes narrower.

This state is one such that a switching element is not conducting at minimum output in FIG. 14A showing an operation example of a welding machine by PWM control. Such a situation is of a problem particularly when requiring stable control on an output current in a range of several amperes, as in a TIG welding machine.

This phenomenon undesirably causes heat generation of an element and transformer saturation due to an unstable transformer current near a minimum drive width because the switching element is inadequately driven due to insufficient power for driving the gate of the switching element.

As shown in FIG. 9B, in operation by one-side bridge fixed conduction width pulse-width modulation near a minimum current, a charging current to a snubber capacitor causes a primary current to flow through transformer 6, thereby generating unintended output at the secondary side of the transformer. Accordingly, a large capacitance of the snubber capacitor leads to difficulty in control at low output, which prevents an output current or output voltage of the welding machine from falling to a minimum output.

An inverter-controlled welding machine by conventional phase control method does not need to expand and contract the driving pulse width of a switching element, and thus is not affected by delay time in the drive path, allowing control with a high degree of accuracy even at low output.

In the above case, however, the switching elements composing first switching circuit 25 and second switching circuit 26 simultaneously conduct for a relatively long time. This brings about a large regenerative current, thereby causing more heat generation in a regeneration diode contained in a switching element and a higher switching loss at the transistor.

As described above, phase control method involves a large regenerative current and difficulty in preventing heat generation in the device. Meanwhile, PWM control method has difficulty in controlling a minute current well accurately.

PRIOR ART DOCUMENT

Patent Literature

[Patent literature 1] Japanese Patent Unexamined Publication No. 2004-322189

SUMMARY OF THE INVENTION

The present invention, in order to solve the above-described problems, provides an inverter control device that prevents a regenerative current to suppress heat generation for whatever the magnitude of a signal such as an error amplification signal of the inverter control device and controls an output current well accurately.

An inverter control device of the present invention includes: a first rectifier rectifying AC input; a first switching element and a second switching element inserted between the outputs of the first rectifier, composing a first switching circuit, series-connected; a third switching element and a fourth switching element inserted between the outputs of the first rectifier, composing a second switching circuit, series-connected; a power conversion transformer, one primary winding of which is connected to the junction between the first and second switching elements and the other primary winding of which is connected to the junction between the third and fourth switching elements; a second rectifier rectifying output from the power conversion transformer; an output power detecting part detecting an output current or output voltage from the second rectifier; an output power setting part for preliminarily setting an output current or output voltage; an error amplification part determining an error between signals from the output power detecting part and the output power setting part, and outputting the error; and an inverter control part outputting a signal for controlling operation of the first and second switching circuits according to a signal from the error amplification part. The inverter control part includes: a first switching circuit control part outputting a drive signal for alternately bringing the first and second switching elements composing the first switching circuit into conduction; and a second switching circuit control part outputting a drive signal for alternately bringing the third and fourth switching elements composing the second switching circuit into conduction. The second switching circuit control part includes: a pulse-width modulating part generating a conduction width that is time during which the third and the fourth switching elements are kept in conduction, according to a signal from the error amplification part, and outputting the conduction width; a phase control part generating conduction time during which the third and fourth switching elements are kept in conduction, where the time is a phase difference relative to the conduction time for the first and second switching elements, according to a signal from the error amplification part, and outputting the phase difference; and a signal changing part accepting a signal from the pulse-width modulating part and a signal from the phase control part, and outputting one of the signal from the pulse-width modulating part and the signal from the phase control part according to a signal from the error amplification part.

This configuration allows the inverter control device to exercise control by PWM control method and phase control method. Hence, when an error amplification signal is larger than a predetermined threshold, PWM control method is used to prevent a regenerative current to suppress heat generation of a switching element. When smaller, phase control method is used to enable an output current to be controlled well accurately.

The inverter control device of the present invention includes: a first rectifier rectifying AC input; a first switching element and a second switching element inserted between the outputs of the first rectifier, composing a first switching circuit, series-connected; a third switching element and a fourth switching element inserted between the outputs of the first rectifier, composing a second switching circuit, series-connected; a power conversion transformer, one primary winding of which is connected to the junction between the first and second switching elements and the other primary winding of which is connected to the junction between the third and fourth switching elements; a second rectifier rectifying output from the power conversion transformer; an output power detecting part detecting an output current or output voltage from the second rectifier; an output power setting part for preliminarily setting an output current or output voltage; an error amplification part determining an error between signals from the output power detecting part and the output power setting part, and outputting the error; and an inverter control part outputting a signal for controlling operation of the first and second switching circuits according to a signal from the error amplification part. The inverter control part includes: a first switching circuit control part outputting a drive signal for alternately bringing the first and second switching elements composing the first switching circuit into conduction; and a second switching circuit control part outputting a drive signal for alternately bringing the third and fourth switching elements composing the second switching circuit into conduction. The second switching circuit control part includes: a pulse-width modulating part generating a conduction width that is time during which the third and the fourth switching elements are kept in conduction, according to a signal from the error amplification part, and outputting the conduction width; a phase control part generating a drive signal with a phase difference relative to a drive signal from the first switching circuit control part according to an error amplification signal; a driving pulse width changing part changing a driving pulse width from the phase control part according to the error amplification signal; and a signal changing part accepting a signal from the pulse-width modulating part and a signal from the phase control part, and outputting either of the signals according to a signal from the error amplification part.

This configuration allows the inverter control device to exercise control by PWM control method and phase control method. Hence, when an error amplification signal is larger than a predetermined threshold, PWM control method is used to prevent a regenerative current to suppress heat generation of a switching element. When smaller, phase control method is used to enable an output current to be controlled well accurately.

The inverter control device of the present invention includes: a first rectifier rectifying AC input; a first switching element and a second switching element inserted between the outputs of the first rectifier, composing a first switching circuit, series-connected; a third switching element and a fourth switching element inserted between the outputs of the first rectifier, composing a second switching circuit, series-connected; a power conversion transformer one primary winding of which is connected to the junction between the first and second switching elements and the other primary winding of which is connected to the junction between the third and fourth switching elements; a second rectifier rectifying output from the power conversion transformer; an output power detecting part detecting an output current or output voltage from the second rectifier; an output power setting part for preliminarily setting an output current or output voltage; an error amplification part determining an error between signals from the output power detecting part and the output power setting part, and outputting the error; and an inverter control part outputting a signal for controlling operation of the first and second switching circuits, according to a signal from the error amplification part. The inverter control part includes: a first switching circuit control part outputting a drive signal for alternately bringing the first and second switching elements composing the first switching circuit into conduction; and a second switching circuit control part outputting a drive signal for alternately bringing the third and fourth switching elements composing the second switching circuit into conduction. The second switching circuit control part includes: a pulse-width modulating part generating a conduction width that is time during which the third and the fourth switching elements are kept in conduction, according to a signal from the error amplification part, and outputting the conduction width; an additional driving pulse generating part outputting a drive signal to be added to the beginning of a drive signal output from the pulse-width modulating part; and a combining part combining output from the pulse-width modulating part with output from the additional driving pulse generating part.

This configuration allows the inverter control device to exercise control by PWM control method and phase control method. Hence, when an error amplification signal is larger than a predetermined threshold, PWM control method is used to prevent a regenerative current to suppress heat generation of a switching element. When smaller, phase control method is used to enable an output current to be controlled well accurately.

The inverter control method of the present invention is a method of controlling an inverter control device including: a first rectifier rectifying AC input; a first switching element and a second switching element inserted between the outputs of the first rectifier, composing a first switching circuit, series-connected; a third switching element and a fourth switching element inserted between the outputs of the first rectifier, composing a second switching circuit, series-connected; a power conversion transformer one primary winding of which is connected to the junction between the first and second switching elements and the other primary winding of which is connected to the junction between the third and fourth switching elements; a second rectifier rectifying output from the power conversion transformer; an output power detecting part detecting an output current or output voltage from the second rectifier; an output power setting part for preliminarily setting an output current or output voltage; an error amplification part determining an error between signals from the output power detecting part and the output power setting part, and outputting the error; and an inverter control part outputting a signal for controlling operation of the first and second switching circuits according to a signal from the error amplification part. The method using an inverter control part includes: a pulse width change controlling step of changing conduction time during which the third and fourth switching elements are kept in conduction according to a signal from the error amplification part; and a phase controlling step of changing conduction time during which the third and fourth switching elements are kept in conduction according to a signal from the error amplification part so that the conduction time has a phase difference relative to the conduction time of the first and the second switching elements. When the magnitude of the error amplification signal is within a predetermined first range, the pulse width controlling step is performed. When the magnitude is within a predetermined second range that is smaller than the first range, at least the phase controlling step is performed.

This method allows inverter control by PWM control method and phase control method. Hence, when an error amplification signal is larger than a predetermined threshold, PWM control method is used to prevent a regenerative current to suppress heat generation of a switching element. When smaller, phase control method is used to enable an output current to be controlled well accurately.

As described thereinbefore, the present invention allows using two control methods: PWM control method and phase control method. Hence, when an error amplification signal is larger than a predetermined threshold, PWM control method is used to prevent a regenerative current to suppress heat generation of a switching element. When smaller, phase control method is used to enable an output current to be controlled well accurately.

DETAILED DESCRIPTION OF PREFERRED EMBODIMENTS

Hereinafter, a description is made of some exemplary embodiments of the present invention with reference to the related drawings. In the following drawings, the same component is given the same reference mark, and its description may be omitted. The scope of the present invention is not limited by these exemplary embodiments.

First Exemplary Embodiment

Figure 1:
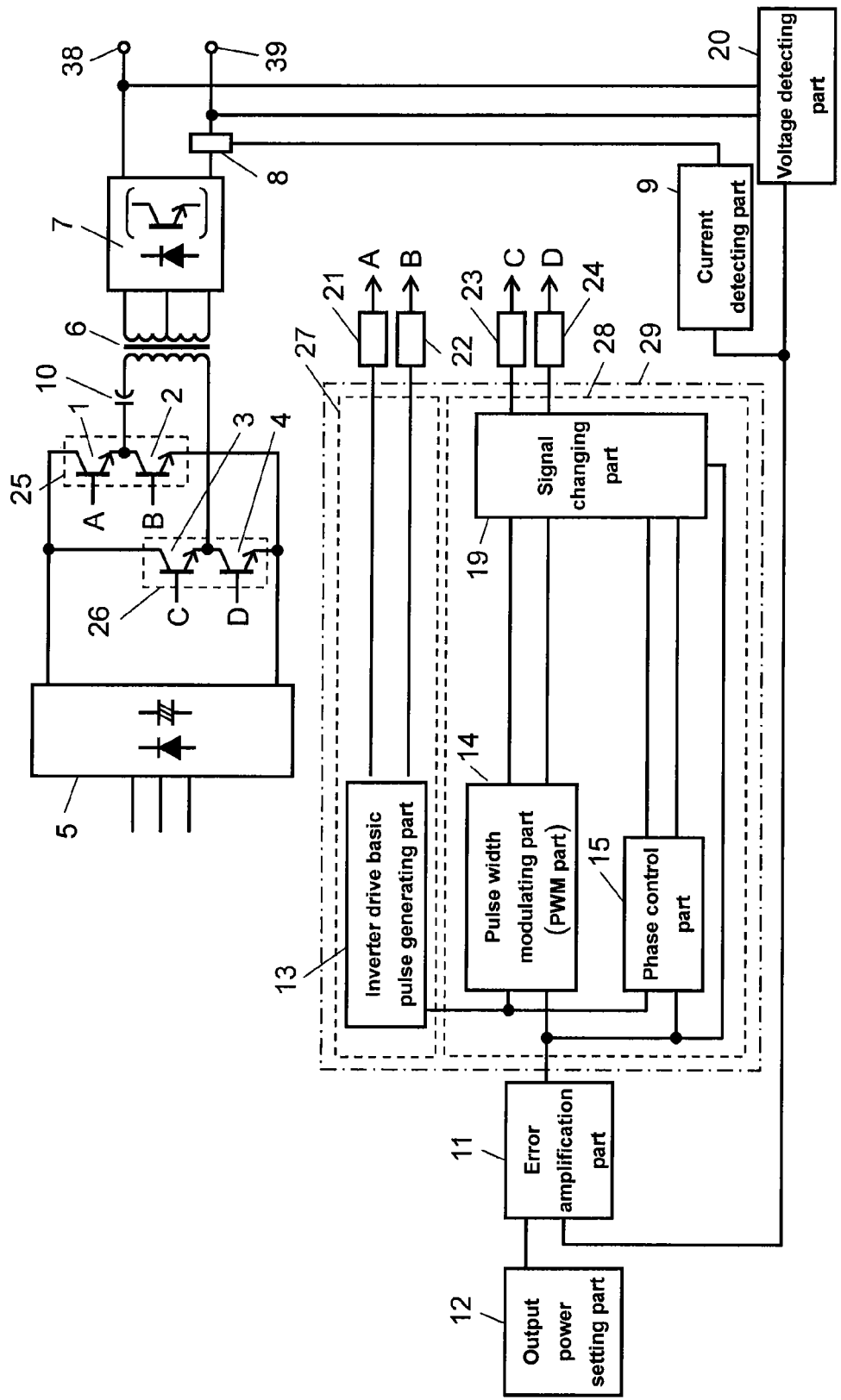
FIG. 1 shows an outline structure of substantial parts of the inverter control device of an arc welding machine according to the first exemplary embodiment of the present invention.
Figure 2A:
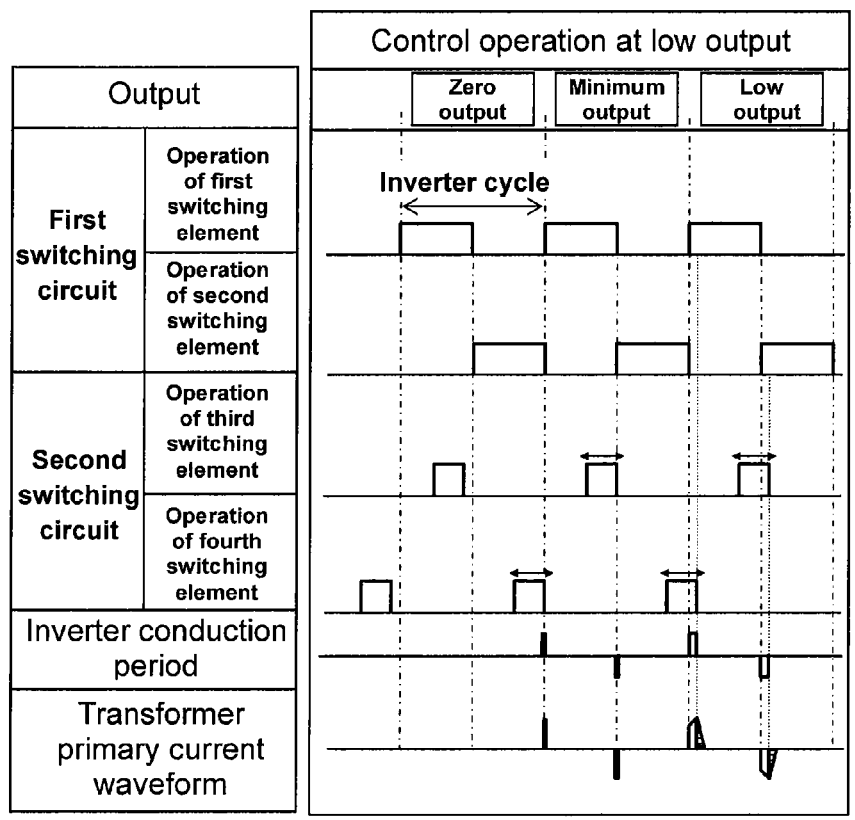
FIG. 2A is a schematic diagram of operation of the components of the inverter control device of an arc welding machine according to the first exemplary embodiment of the present invention.
Figure 2B:
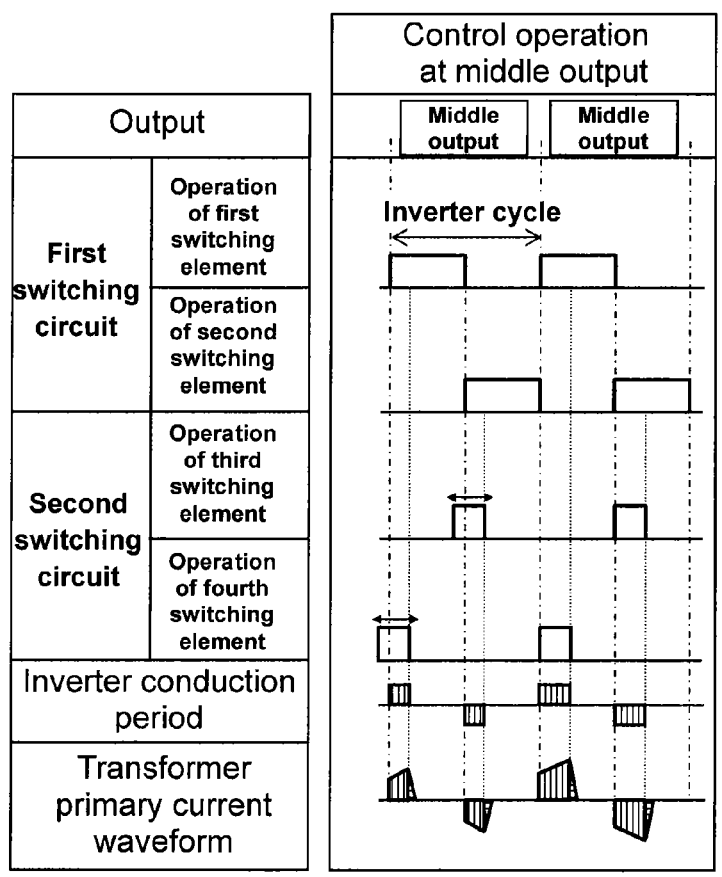
FIG. 2B is a schematic diagram of operation of the components of the inverter control device of an arc welding machine according to the first exemplary embodiment of the present invention.
Figure 2C:
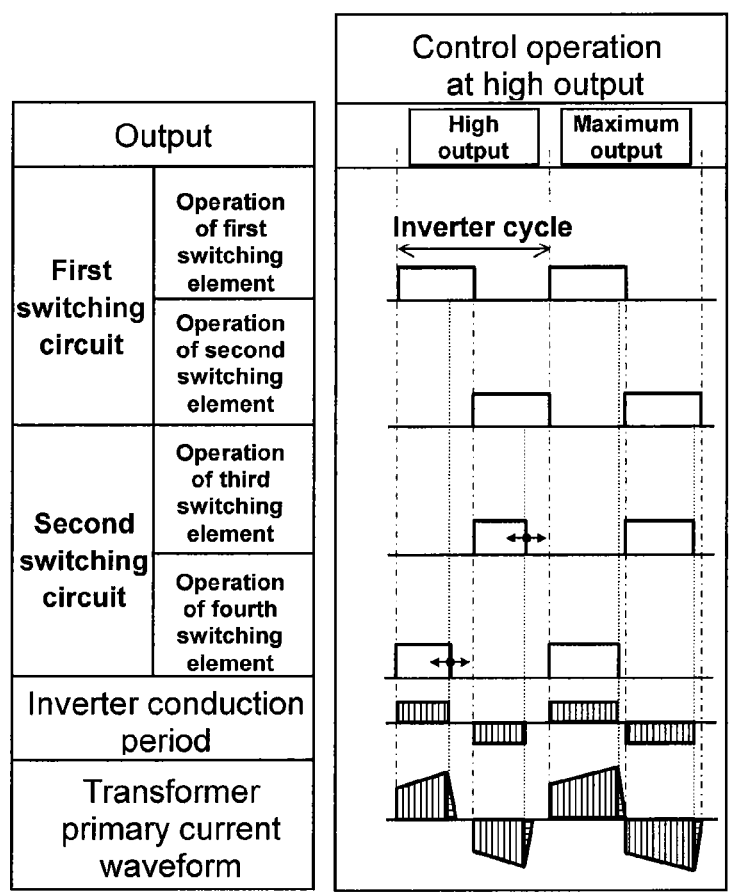
FIG. 2C is a schematic diagram of operation of the components of the inverter control device of an arc welding machine according to the first exemplary embodiment of the present invention.

A description is made of an arc welding machine using an inverter control device according to the first exemplary embodiment using FIG. 1 and FIGS. 2A through 2C. FIG. 1 shows an outline structure of substantial parts of the arc welding machine. FIGS. 2A through 2C are schematic diagrams showing operation of the components of the arc welding machine. FIGS. 2A through 2C illustrate operation of the arc welding machine, specifically operation of a switching element, an inverter conduction period, and a waveform of a transformer primary current at low output (FIG. 2A), middle output (FIG. 2B), and high output (FIG. 2C) for welding.

Here, low, middle, and high output for welding are classified on the basis of the magnitude of an error amplification signal from error amplification part 11 (described later), for example. Specifically, if the magnitude is lower than a predetermined first threshold, the output is low; if between the predetermined first threshold and a predetermined second threshold, middle; and if higher than the predetermined second threshold, high.

First and second thresholds can be determined by such as results of actual welding.

As shown in FIG. 1, the inverter control device of an arc welding machine includes first rectifier 5, first switching element 1 and second switching element 2, third switching element 3 and fourth switching element 4, power conversion transformer 6, second rectifier 7, an output power detecting part (e.g. voltage detecting part 20), output power setting part 12, error amplification part 11, and inverter control part 29. Here, first rectifier 5 rectifies AC input. First switching element 1 and second switching element 2 are inserted between the outputs of first rectifier 5; compose first switching circuit 25; and are series-connected. Third switching element 3 and fourth switching element 4 are inserted between the outputs of first rectifier 5; compose second switching circuit 26; and are series-connected. One primary winding of power conversion transformer 6 is connected to the junction between first switching element 1 and second switching element 2, and the other primary winding is connected to the junction between third switching element 3 and fourth switching element 4. The primary winding of transformer 6 has capacitor 10 serially inserted therein. Second rectifier 7 rectifies output from transformer 6. The output power detecting part includes voltage detecting part 20 and current detecting part 9. Voltage detecting part 20 detects voltage output from second rectifier 7. Current detector 8 detects a current output from second rectifier 7. Current detecting part 9 converts a signal from current detector 8 to a feedback signal. Error amplification part 11 determines an error between an output current detection signal from current detecting part 9 and an output setting signal from output current setting part 12, and amplifies the error. Inverter control part 29 controls operation of first switching circuit 25 and second switching circuit 26 according to an error amplification signal from amplification part 11.

Inverter control part 29 includes first switching circuit control part 27 and second switching circuit control part 28. Here, first switching circuit control part 27 generates a drive signal for alternately bringing first switching element 1 and second switching element 2 into conduction; second switching circuit control part 28 generates a drive signal for alternately bringing third switching element 3 and fourth switching element 4 into conduction.

First switching circuit control part 27 includes inverter driving basic pulse generating part 13 driving first switching element 1 and second switching element 2 with a constant conduction width. Generating part 13 provides a predetermined conduction time (e.g. the entire half-cycle time minus dead time of a switching element).

Second switching circuit control part 28 includes pulse-width modulating part 14, phase control part 15, and signal changing part 19. Here, modulating part 14 generates a conduction width corresponding to a drive signal input from inverter driving basic pulse generating part 13 of first switching circuit control part 27 and an error amplification signal input from error amplification part 11, and outputs the conduction width. Phase control part 15 generates a drive signal with a phase difference corresponding to a drive signal input from inverter driving basic pulse generating part 13 of first switching circuit control part 27 and an error amplification signal input from error amplification part 11. Signal changing part 19 outputs an output signal selectively from pulse-width modulating part 14 and from phase control part 15, to third driving circuit 23 and fourth driving circuit 24.

First driving circuit 21 controls driving of first switching element 1; second driving circuit 22, second switching element 2; third driving circuit 23, third switching element 3; and fourth driving circuit 24, fourth switching element 4.

As described later, this configuration allows the inverter control device to exercises control by two types of methods: PWM control and phase control. Hence, when an error amplification signal is larger than a predetermined threshold, PWM control method is used to prevent a regenerative current to suppress heat generation of a switching element. When smaller, phase control method is used to enable an output current to be controlled well accurately.

FIGS. 2A through 2C show operating states of an inverter according to the embodiment. FIG. 2A shows operation states at low output (i.e. short inverter conduction period); FIG. 2B, at middle output (i.e. middle-range inverter conduction period); and FIG. 2C, at high output (i.e. long inverter conduction period). FIGS. 2A through 2C schematically show conduction states, conduction periods of an inverter circuit; and waveforms of a primary current through transformer 6, for first switching element 1 through fourth switching element 4.

In FIGS. 2A through 2C, a part indicated by an arrow, of an operation waveform of first switching element 1 to fourth switching element 4 shows how the waveform changes during output control. An arrow appended at the falling edge (dot-marked part) of a waveform shows that the edge moves back and forth, and the waveform expands and contracts to control output as indicated by the inverter conduction period. An arrow appended at the top of a waveform shows that the waveform does not expand or contract, and the entire waveform moves back and forth for operation. This indicates that the phase of the waveform changes to control output as shown by the inverter conduction period. A horizontally striped part of the waveform of a primary current through a transformer represents a regenerative current as described under Background Art.

A description is made of operation of an arc welding machine configured as above. In FIG. 1, three- or single-phase AC input rectified by first rectifier 5 is converted to an alternating current with a high frequency by a full-bridge inverter circuit composed of switching elements 1, 2, 3, and 4, and then input to the primary side of transformer 6. The secondary-side output of transformer 6 is rectified by second rectifier 7 and is supplied to an electrode and parent material (i.e. both are arc loads, not shown) through output terminals 38 and 39 of the arc welding machine.

An output current from an arc welding machine is detected by current detector 8, and a feedback signal proportional to the output current is input from current detector 8 to error amplification part 11 through current detecting part 9. Error amplification part 11 compares an output current set value from output power setting part 12 to a feedback signal from current detecting part 9, and outputs an error amplification signal between both. The error amplification signal is input to pulse-width modulating part 14, phase control part 15, and signal changing part 19.

Inverter driving basic pulse generating part 13 outputs inverter driving basic pulses for driving first switching element 1 and second switching element 2 composing first switching circuit 25 alternately with a fixed conduction width.

The inverter driving basic pulses are converted to a signal suitable for driving first switching element 1 and second switching element 2 by first driving circuit 21 and second driving circuit 22, and is input to first switching element 1 and second switching element 2.

Pulse-width modulating part 14 accepts a basic pulse waveform for inverter driving generated by inverter driving basic pulse generating part 13. Driving pulses are generated with a width corresponding to the level of an error amplification signal from error amplification part 11 on a basis of the basic pulse waveform. The driving pulses are separated one by one alternately into two series: for third driving circuit 23 and for fourth driving circuit 24, and are input to signal changing part 19 as 2-series drive signals for inverter driving.

Phase control part 15 accepts a basic pulse waveform for inverter driving generated by inverter driving basic pulse generating part 13. Driving pulses are generated with a phase difference corresponding to the level of an error amplification signal in relation to the basic pulse waveform. The driving pulses are separated one by one alternately into two series: for third driving circuit 23 and for fourth driving circuit 24, and are input to signal changing part 19 as 2-series drive signals for inverter driving.

Signal changing part 19 outputs a drive signal input selectively from pulse-width modulating part 14 and from phase control part 15 to third driving circuit 23 and fourth driving circuit 24, according to the level of an error amplification signal from error amplification part 11. The drive signal output from signal changing part 19 is converted to a signal suitable for driving third switching element 3 and fourth switching element 4 by third driving circuit 23 and fourth driving circuit 24, and is input to third switching element 3 and fourth switching element 4.

During a period when a conduction period of first switching element 1 coincides with that of fourth switching element 4, a primary current flows through transformer 6 from first switching element 1 to fourth switching element 4. Meanwhile, during a period when a conduction period of second switching element 2 coincides with that of third switching element 3, a primary current flows through transformer 6 from third switching element 3 to second switching element 2. In this way, output from first rectifier 5 is converted to an alternating current; is converted to output power suitable for welding; and is output from the secondary winding of transformer 6. The output from the secondary winding of transformer 6 is converted to a direct current by second rectifier 7 and is output from the welding machine as welding output power.

When the magnitude of an error amplification signal is larger than a predetermined threshold (i.e. a large transformer current conduction width), signal changing part 19 outputs a drive signal from pulse-width modulating part 14; when smaller (i.e. a small transformer current conduction width), outputs a drive signal from phase control part 15.

In this way, third switching element 3 and fourth switching element 4 composing second switching circuit 26 are driven with pulse-width modulation at high output; with phase control method at low output. Accordingly, a regenerative current can be better suppressed at high output as compared to phase control method; a small current can be better accurately controlled as compared to PWM method.

The pulse width for phase control method is determined as a pulse width for pulse-width modulation when switching is made from pulse-width modulation to phase control method.

Here, first switching element 1 and second switching element 2 composing first switching circuit 25 are alternately operated according to a signal from inverter driving basic pulse generating part 13, independently of the output level, with a fixed conduction width by first driving circuit 21 and second driving circuit 22.

Next, a description is made of operation of the inverter control device of an arc welding machine according to the first exemplary embodiment using FIGS. 2A through 2C.

FIGS. 2A through 2C show operation examples of the components of an arc welding machine, namely circuit operation examples of an inverter control device. FIG. 2A for control operation at low output including a part near a minimum conduction width and FIG. 2B for control operation at middle output show examples where second switching circuit 26 is operating while being controlled with phase control method in relation to first switching circuit 25. FIG. 2C shows an example where the switching circuit is operating while being controlled with pulse-width modulation.

Here, the driving pulse width of a drive signal undergoing phase control in FIGS. 2A and 2B is set to the drive signal width at a time point when operation by pulse-width modulation in FIG. 2C changes to operation by phase control in FIG. 2B. This setting makes control shift smoothly from operation by pulse-width modulation to operation by phase control.

The drive signal width at a time point when operation by pulse-width modulation changes to operation by phase control is assumed to be a drive signal width smaller than 50% if the maximum conduction width is 100%, for example.

As shown in FIG. 1, the primary winding of transformer 6 is provided with capacitor 10 serially. Capacitor 10 enables reducing a regenerative current as shown by horizontal stripes in a transformer primary current waveform in FIGS. 2A to 2C. This prevents a switching element from generating heat due to a regenerative current, unlike by conventional phase control method, even if control is exercised by phase control method. Here, setting the capacitance of capacitor 10 to several μF for an arc welding machine with an output class of 350 A is most effective for suppressing a regenerative current, which has been experimentally proven.

Setting operation of first switching circuit 25 to near a maximum conduction width results in a transformer primary current being interrupted by third switching element 3 and fourth switching element 4. Herewith, first switching element 1 and second switching element 2 do not interrupt a current, thereby significantly reducing switching loss in first switching element 1 and second switching element 2 to suppress heat generation.

As described above, with the arc welding machine using the inverter control device of the first exemplary embodiment, first switching circuit 25 (i.e. one of the two switching circuits) is driven with a fixed conduction width; second switching circuit 26 (i.e. the other switching circuit) is driven with pulse-width modulation at high output and by phase control method at low output. Further, capacitor 10 serially connected to the primary side of transformer 6 suppresses a regenerative current. These facts allow implementing an inverter control device in which advantages of pulse-width modulation and phase control method are merged, and allow implementing an arc welding machine using an inverter control device enabling highly accurate control at low output while significantly suppressing heat generation in a switching element.

Switching between pulse-width modulation method and phase control method is made as follows. That is, if a signal from error amplification part 11 is larger than a predetermined threshold, pulse-width modulation is used; if smaller, phase control method is used.

In the first exemplary embodiment, the description is made of current control using output current detector 8 and output current detecting part 9. Besides, it is obvious that voltage control where the output current detector is replaced with output voltage detecting part 20 follows the same operation. Voltage control is suitable for consumable electrode welding; and current control, for non-consumable.

In this embodiment, a programmable integrated logic element may be used such as a CPU, DSP, and FPGA as inverter control part 29.

Second Exemplary Embodiment

Figure 3:
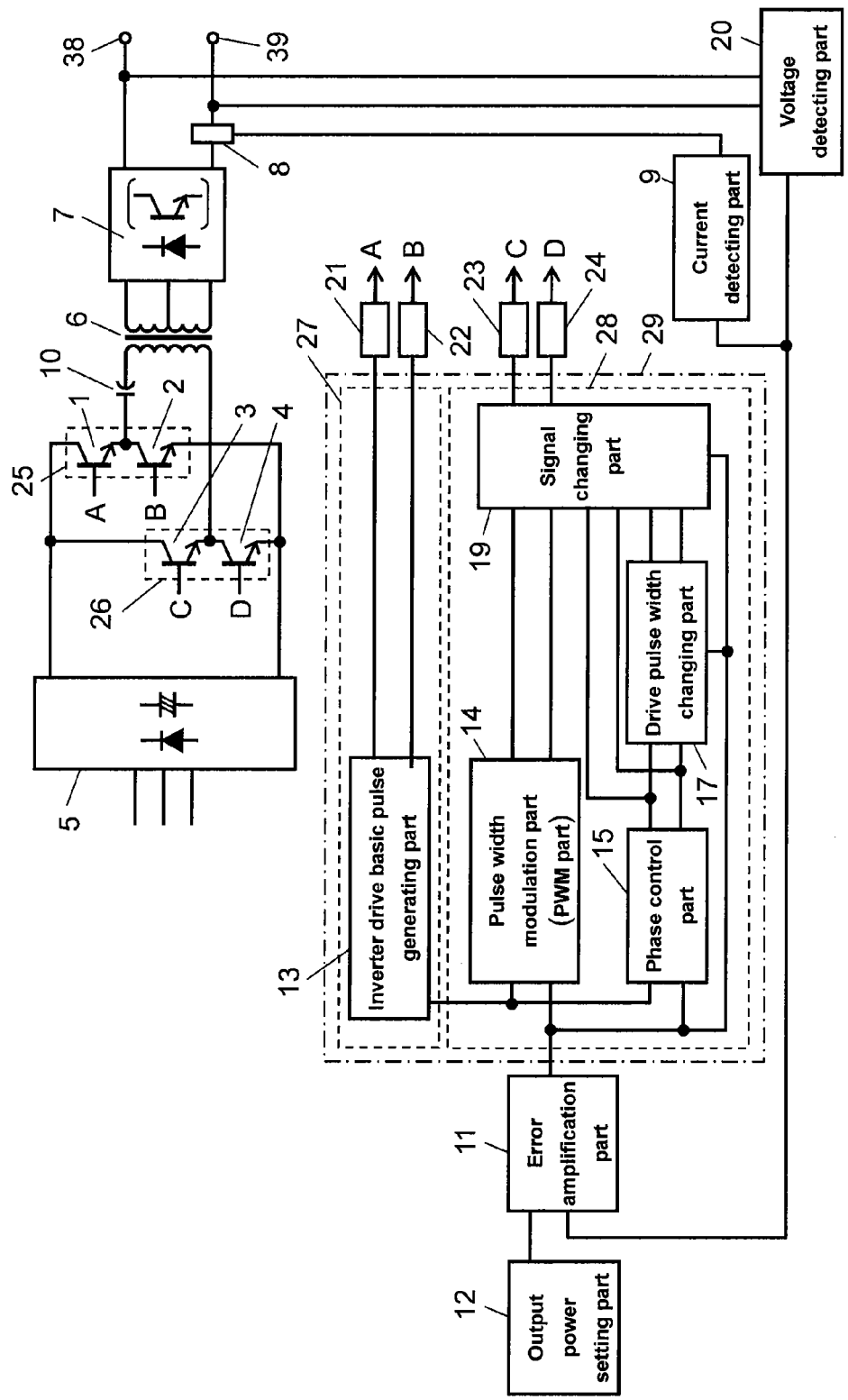
FIG. 3 shows an outline structure of substantial parts of the inverter control device of an arc welding machine according to the second exemplary embodiment of the present invention.
Figure 4A:
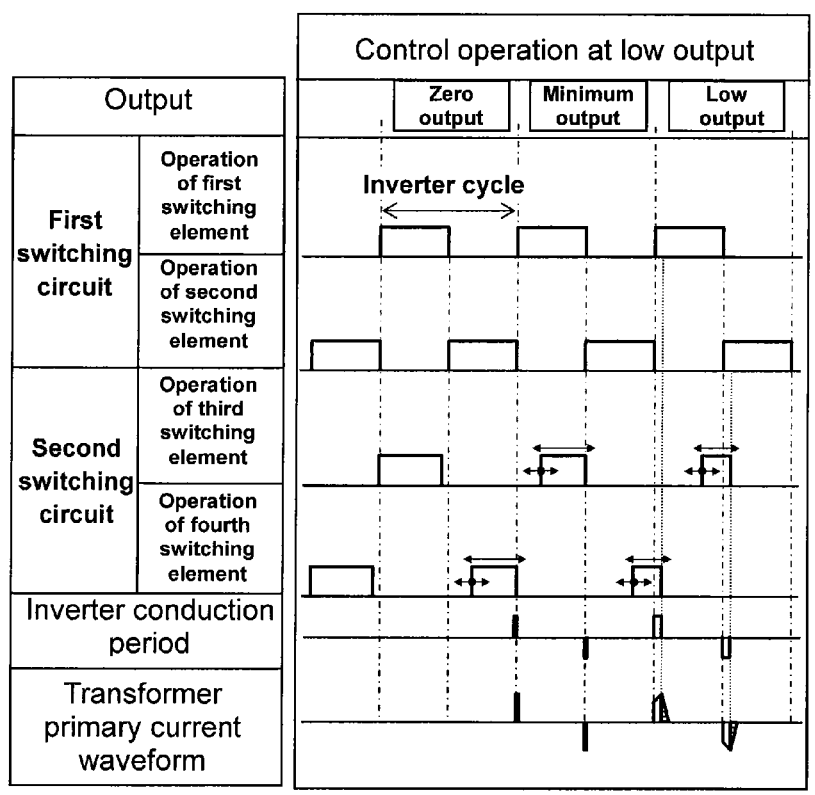
FIG. 4A is a schematic diagram of operation of the components of the inverter control device of an arc welding machine according to the second exemplary embodiment of the present invention.
Figure 4B:
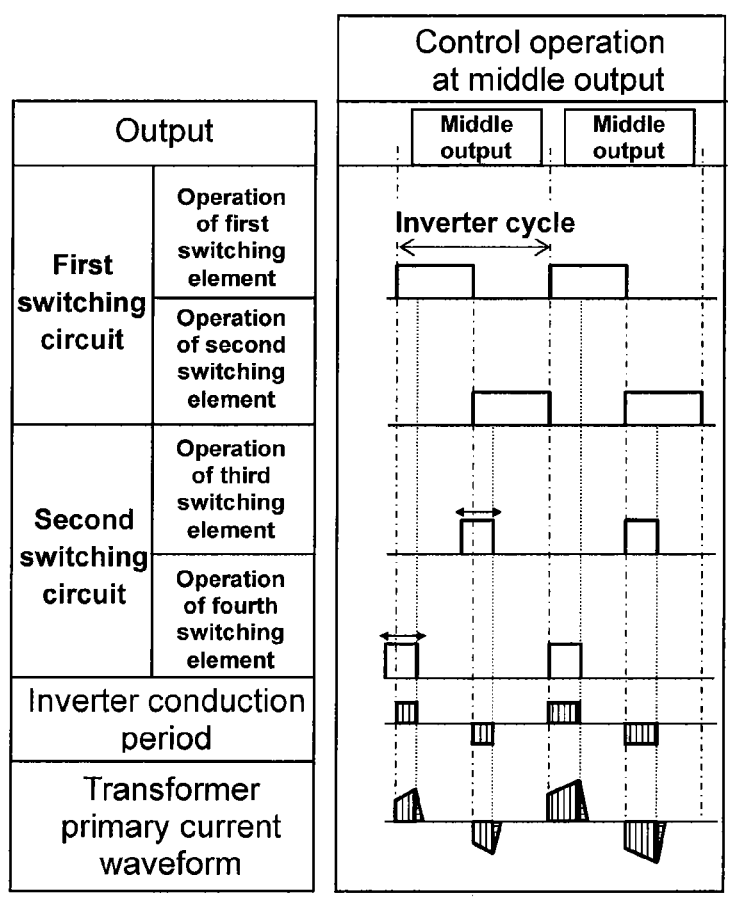
FIG. 4B is a schematic diagram of operation of the components of the inverter control device of an arc welding machine according to the second exemplary embodiment of the present invention.
Figure 4C:
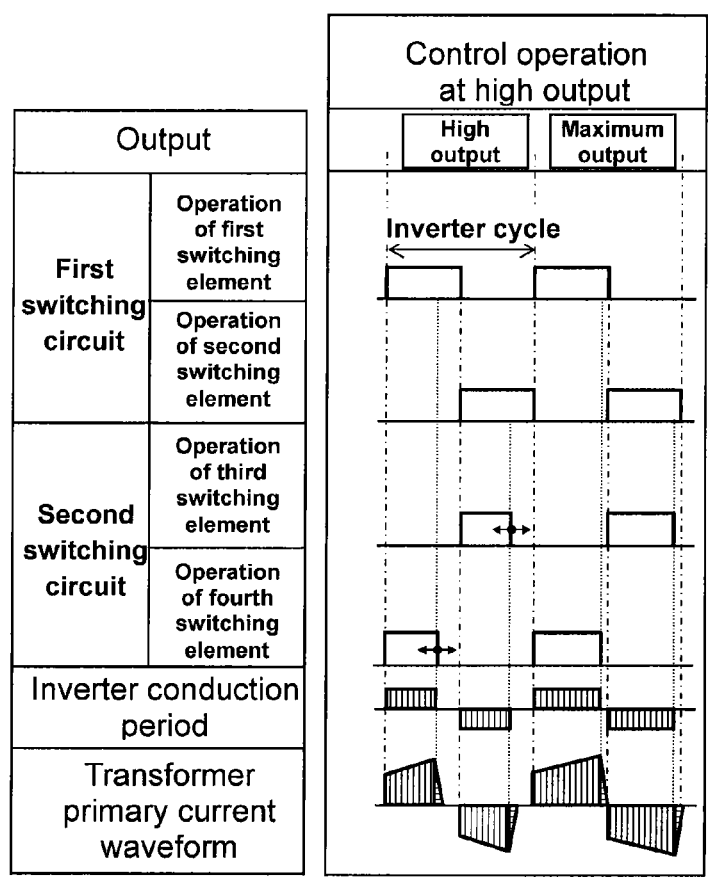
FIG. 4C is a schematic diagram of operation of the components of the inverter control device of an arc welding machine according to the second exemplary embodiment of the present invention.

A description is made of an arc welding machine including an inverter control device of the second exemplary embodiment using FIG. 3 and FIGS. 4A through 4C. FIG. 3 shows an outline structure of substantial parts of the inverter control device. FIGS. 4A through 4C illustrate operation of the inverter control device, specifically operation of a switching element, an inverter conduction period, and a waveform of a transformer primary current at low output (FIG. 4A), middle output (FIG. 4B), and high output (FIG. 4C) for welding.

In this embodiment, a component or portion same as that in the first embodiment is given the same reference mark to omit its detailed description.

The principal point different from the first embodiment is the configuration of inverter control part 29. Specifically, the second embodiment includes driving pulse width changing part 17 as described later. Further, signal changing part 19 outputs an output signal selectively from pulse-width modulating part 14, phase control part 15, and driving pulse width changing part 17, to third driving circuit 23 and fourth driving circuit 24.

In the inverter control device of the arc welding machine in FIG. 3, second switching circuit control part 28 composing inverter control part 29 includes driving pulse width changing part 17 changing a driving pulse width from phase control part 15. Changing part 17 thus changes a driving pulse width from phase control part 15, eventually resulting in output from driving pulse width changing part 17 being a signal with both its phase and pulse width changed.

FIGS. 4A through 4C show operating states of the inverter control device according to the second embodiment. FIG. 4A shows operation states at low output (i.e. short inverter conduction period); FIG. 4B, at middle output (i.e. middle-range inverter conduction period); and FIG. 4C, at high output (i.e. long inverter conduction period). The figures schematically show conduction states, conduction periods of the inverter circuit; and waveforms of a primary current through transformer 6, for first switching element 1 through fourth switching element 4.

In FIGS. 4A through 4C, a part indicated by an arrow, of an operation waveform of first switching element 1 to fourth switching element 4 shows how the waveform changes during output control. An arrow appended at the edge (falling edge of the waveform) shows that the edge moves back and forth, and the waveform expands and contracts. An arrow appended at the top of a waveform shows that the entire waveform moves back and forth for operation; the phase of the waveform changes to control output by a conduction period as shown by the inverter conduction period. A horizontally striped part of the waveform of a primary current through a transformer represents a regenerative current.

A description is made of operation of the inverter control device of an arc welding machine structured as above.

In FIG. 3, a portion indicated by the same reference mark as that in FIG. 1 operates in the same way as in the first embodiment, and thus its detailed description is omitted.

An error amplification signal having been input from error amplification part 11 to second switching circuit control part 28 is input to pulse-width modulating part 14 and phase control part 15.

Pulse-width modulating part 14 generates driving pulses with a width based on the level (magnitude) of an error amplification signal on a basis of a basic pulse waveform for inverter driving generated by inverter driving basic pulse generating part 13. The driving pulses are separated one by one alternately into two series and are output as 2-series drive signals for inverter driving.

Phase control part 15 generates driving pulses having a phase difference based on the level of an error amplification signal, in relation to a basic pulse waveform for inverter driving generated by inverter driving basic pulse generating part 13. The driving pulses are separated one by one alternately into two series and are input to signal changing part 19 as well as to driving pulse width changing part 17 as 2-series drive signals for inverter driving.

Driving pulse width changing part 17 changes the drive signal width input from phase control part 15 according to the level of an error amplification signal and inputs the drive signal to signal changing part 19. Here, setting is made so that driving pulse width changing part 17 changes the drive signal width so as to be inversely proportional to the level of the error amplification signal. Herewith, a low level of the error amplification signal causes inverter output to decrease and to expand the drive signal width, resulting in being similar to regular phase control operation. For example, the width expands at a part temporally before a rising edge of a switching element composing first switching circuit 25 as shown in FIG. 4A.

Signal changing part 19 outputs a drive signal selectively from pulse-width modulating part 14, phase control part 15, and driving pulse width changing part 17, according to the level of an error amplification signal.

In this way, third switching element 3 and fourth switching element 4 composing second switching circuit 26 can be driven with pulse-width modulation at high output; with phase control method (a relatively short driving pulse width) at middle output; the driving pulse width expands as output decreases while operating with phase control method at low output; and can be driven in the same state as with regular phase control method at minimum output.

Here, if an error amplification signal is lower than a predetermined first threshold, a drive signal from driving pulse width changing part 17 is output; if higher than the first threshold and lower than a predetermined second threshold, from phase control part 15; and if higher than the second threshold, from pulse-width modulating part 14. First and second thresholds can be determined to appropriate values for the welding by such as results of actual welding.

That is, the inverter control method according to the first embodiment of the present invention is one for an inverter control device of the first and second embodiments, particularly including a pulse width change controlling step and phase controlling step as a method using inverter control part 29. Here, the pulse width change controlling step changes time during which third switching element 3 and fourth switching element 4 are kept in conduction, according to a signal from error amplification part 11. The phase controlling step changes conduction time for third switching element 3 and fourth switching element 4 so as to contain a phase difference in relation to conduction time for first switching element 1 and second switching element 2, according to a signal from error amplification part 11.

In the inverter control method of the first and second embodiments, when the magnitude of the error amplification signal is within a predetermined first range, the pulse width controlling step is performed; and when the magnitude is within a predetermined second range that is smaller than the first range, at least the phase controlling step is performed.

This method allows inverter control method to exercise control by PWM control method and phase control method. Hence, when an error amplification signal is larger than a predetermined threshold, PWM control method is used to prevent a regenerative current to suppress heat generation of a switching element. When smaller, phase control method is used to enable an output current to be controlled well accurately.

When an error amplification signal is within a predetermined third range that is smaller than the second range, the inverter control part may perform both the pulse width controlling step and phase controlling step.

With this method, when an error amplification signal is larger than a predetermined threshold, PWM control method is used to prevent a regenerative current to suppress heat generation of a switching element; when smaller, phase control method is used to enable an output current to be controlled well accurately.

The following arrangement may be made. That is, the first and second ranges are continuous with each other. The phase controlling step performed when the magnitude of an error amplification signal is within the second range is performed with a pulse width fixed to that when the error amplification signal is at the minimum within the first range.

With this method, when an error amplification signal is larger than a predetermined threshold, PWM control method is used to prevent a regenerative current to suppress heat generation of a switching element; when smaller, phase control method is used to enable an output current to be controlled well accurately.

A drive signal output from signal changing part 19 is converted to a signal suitable for driving third switching element 3 and fourth switching element 4 by third driving circuit 23 and fourth driving circuit 24, and is input to third switching element 3 and fourth switching element 4. Here, a signal output from signal changing part 19 is changed according to a signal output from error amplification part 11.

During a period when a conduction period of first switching element 1 coincides with that of fourth switching element 4, a primary current flows through transformer 6 from first switching element 1 to fourth switching element 4. Meanwhile, during a period when a conduction period of second switching element 2 coincides with that of third switching element 3, a primary current flows through transformer 6 from third switching element 3 to second switching element 2. In this way, output from first rectifier 5 is converted to an alternating current; is converted to output power suitable for welding; and is output from the secondary winding of transformer 6. The output from the secondary winding of transformer 6 is converted to a direct current by second rectifier 7 and is output from the welding machine as welding output power.

FIGS. 4A through 4C show operation examples of the inverter control device of an arc welding machine according to the second exemplary embodiment. FIG. 4A shows control operation at low output. As shown in FIG. 4A, as the state changes from low output to minimum output, second switching circuit 26 expands its driving pulse width with its phase shifting in relation to that of first switching circuit 25. Eventually, second switching circuit 26 is in a state same as that by conventional phase control method at zero output.

FIG. 4B shows control operation at middle output. Second switching circuit 26 is operating with phase control method in relation to first switching circuit 25 while maintaining a certain conduction width.

FIG. 4C shows control operation at high output. Second switching circuit 26 is operating with pulse-width modulation in relation to first switching circuit 25.

As shown in FIG. 3, with the inverter control device of the second embodiment, the primary winding of transformer 6 is provided with capacitor 10 serially, which enables reducing a regenerative current compared to a case where capacitor 10 is not provided, as shown by the horizontal stripes in a transformer primary current waveform in FIGS. 4A through 4C. In whichever state of FIGS. 4A to 4C, a regenerative current can be reduced. This shows that heat generated by a regenerative current in phase control method can be significantly suppressed.

Setting is made so that first switching circuit 25 operates with near a maximum conduction width. This leads to a transformer primary current being interrupted by third switching element 3 and fourth switching element 4. Herewith, first switching element 1 and second switching element 2 do not interrupt a current, thereby significantly reducing switching loss in first switching element 1 and second switching element 2 to suppress heat generation.

Operating in the same way as in conventional phase control operation at minimum output prevents a transformer current from conducting due to a charging current to second snubber capacitor 36.

As described above, with an arc welding machine of the second exemplary embodiment, first switching circuit 25 (i.e. one of the two switching circuits) is driven with a fixed conduction width; second switching circuit 26 (i.e. the other switching circuit) is driven with pulse-width modulation at high output; and with phase control method at middle output, to suppress a regenerative current by capacitance 10 serially connected to the primary side of the transformer. These facts allow implementing an inverter welding machine in which advantages of pulse-width modulation and phase control method are merged; enable highly accurate control at low output while significantly suppressing heat generation in a switching element.

At low output, both phase control method and pulse-width modulation are performed, resulting in a drive signal same as that with a drive signal added to a part temporally before a drive signal output by pulse-width modulation. Herewith, conduction of a switching element can be stabilized even at a minute conduction width.

With the inverter control device of the second embodiment, the description is made of current control using output current detector 8 and output current detecting part 9. Besides, it is obvious that voltage control where the output current detector is replaced with output voltage detecting part 20 follows the same operation.

In this embodiment, a programmable integrated logic element may be used such as a CPU, DSP, and FPGA as inverter control part 29.

Third Exemplary Embodiment

Figure 5:
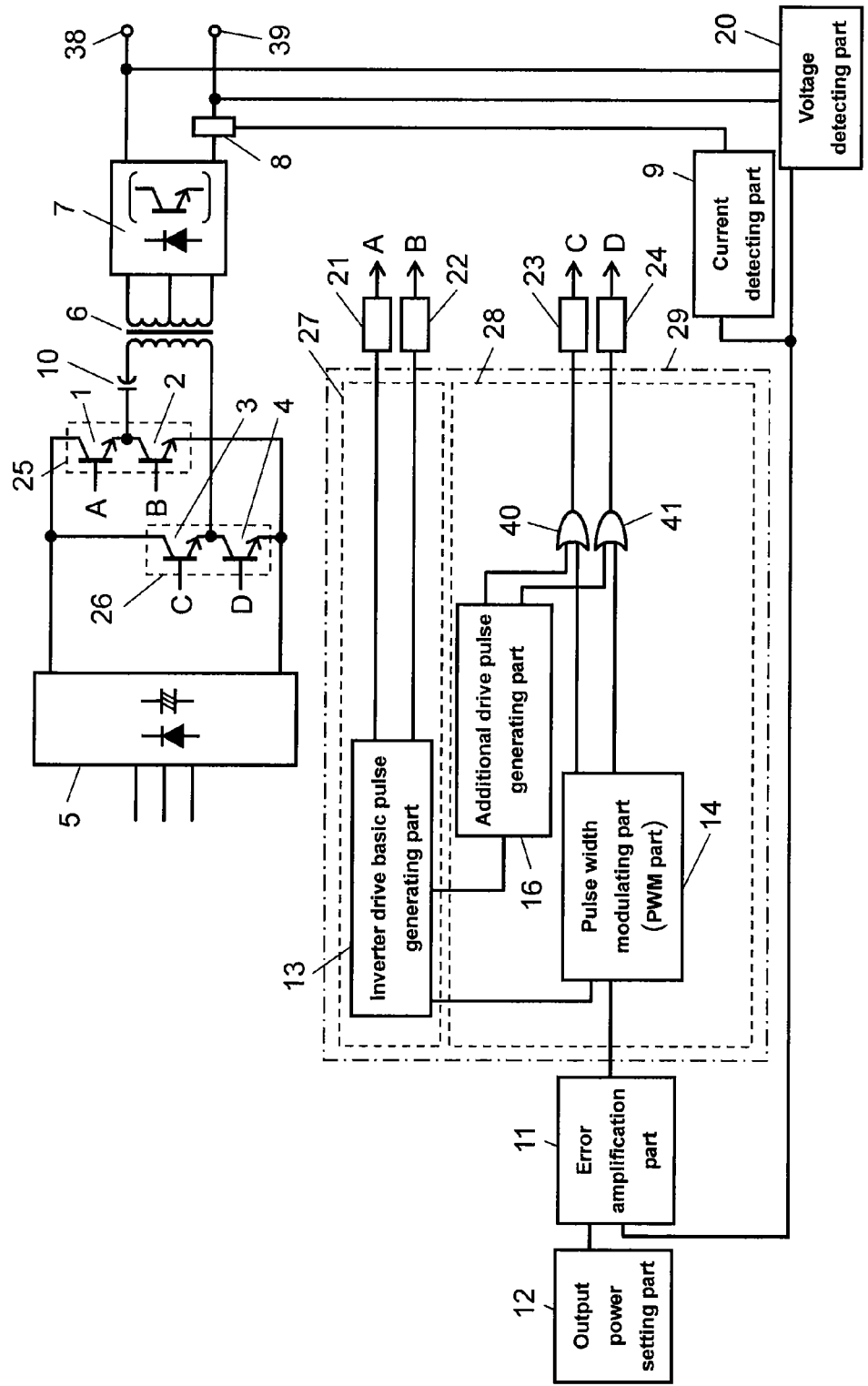
FIG. 5 shows an outline structure of substantial parts of the inverter control device of an arc welding machine according to the third exemplary embodiment of the present invention.
Figure 6A:
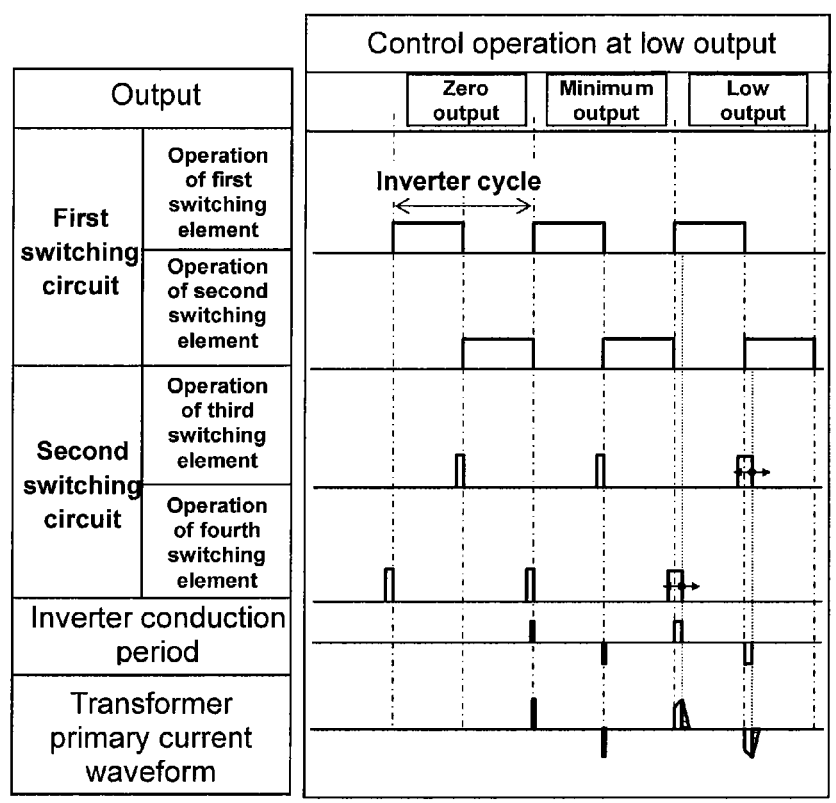
FIG. 6A is a schematic diagram of operation of the components of the inverter control device of an arc welding machine according to the third exemplary embodiment of the present invention.
Figure 6B:
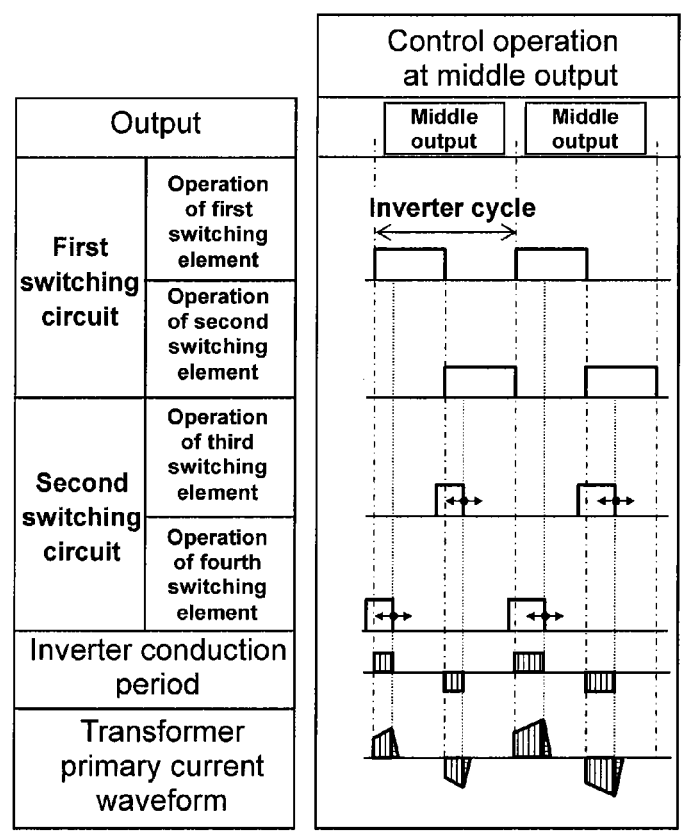
FIG. 6B is a schematic diagram of operation of the components of the inverter control device of an arc welding machine according to the third exemplary embodiment of the present invention.
Figure 6C:
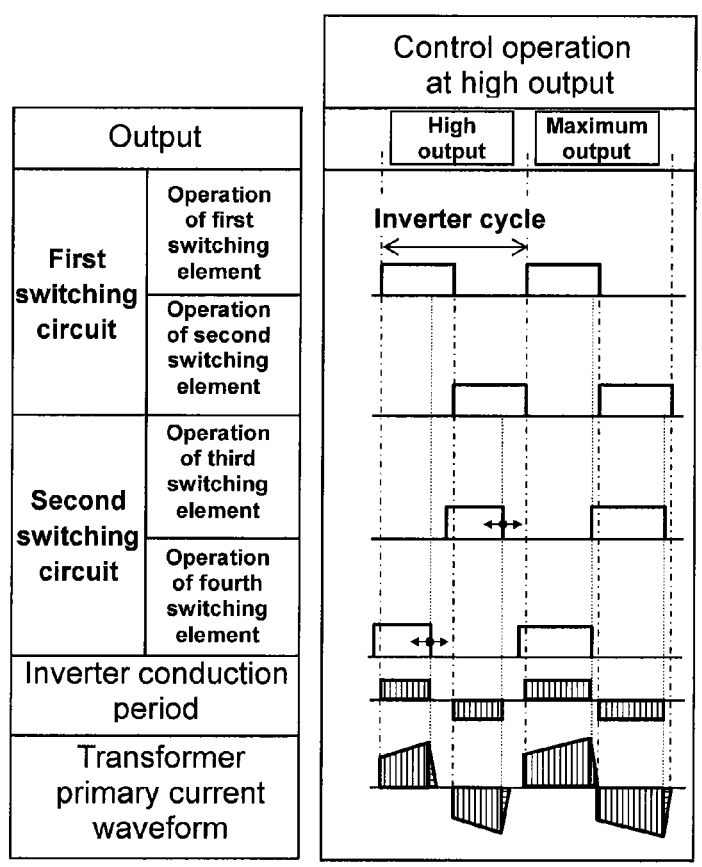
FIG. 6C is a schematic diagram of operation of the components of the inverter control device of an arc welding machine according to the third exemplary embodiment of the present invention.
Figure 7B:
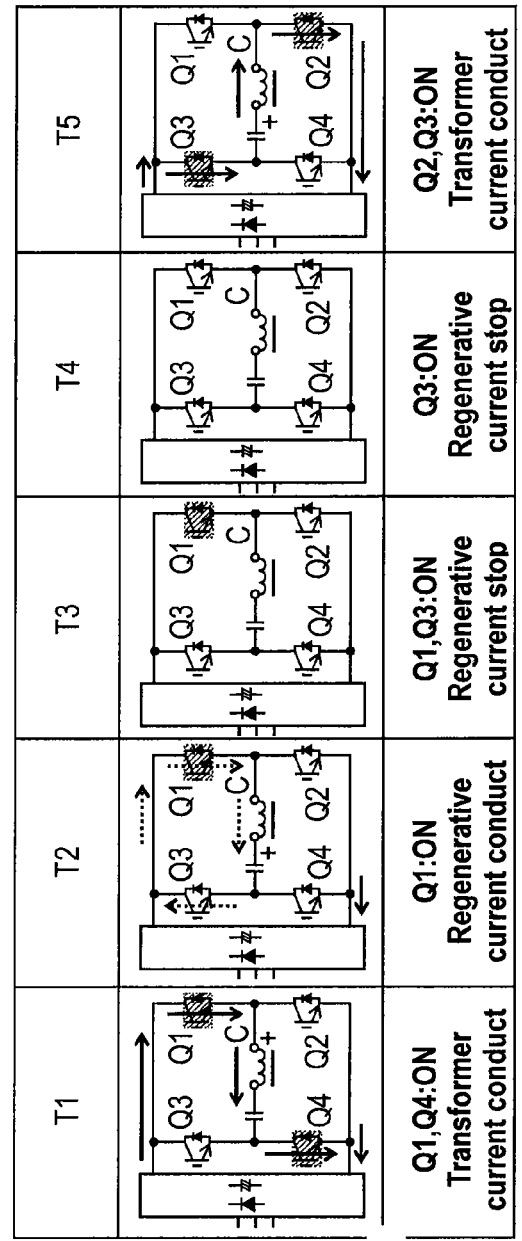
FIG. 7B illustrates inverter operation of the inverter control device according to the third exemplary embodiment of the present invention.
Figure 7A:
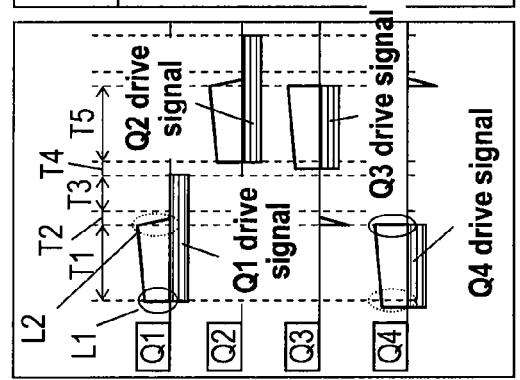
FIG. 7A illustrates inverter operation of an inverter control device according to the third exemplary embodiment of the present invention.
Figures 8A, 8B:
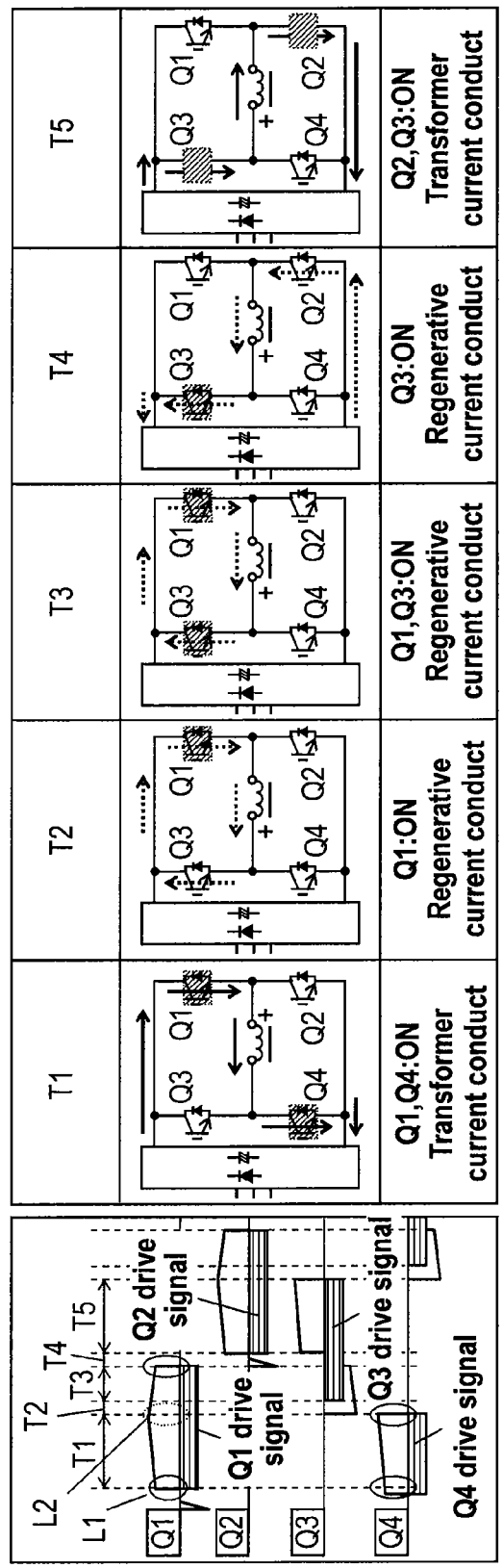
FIG. 8A illustrates inverter operation by phase control method.
FIG. 8B illustrates inverter operation by phase control method.
Figure 9A:
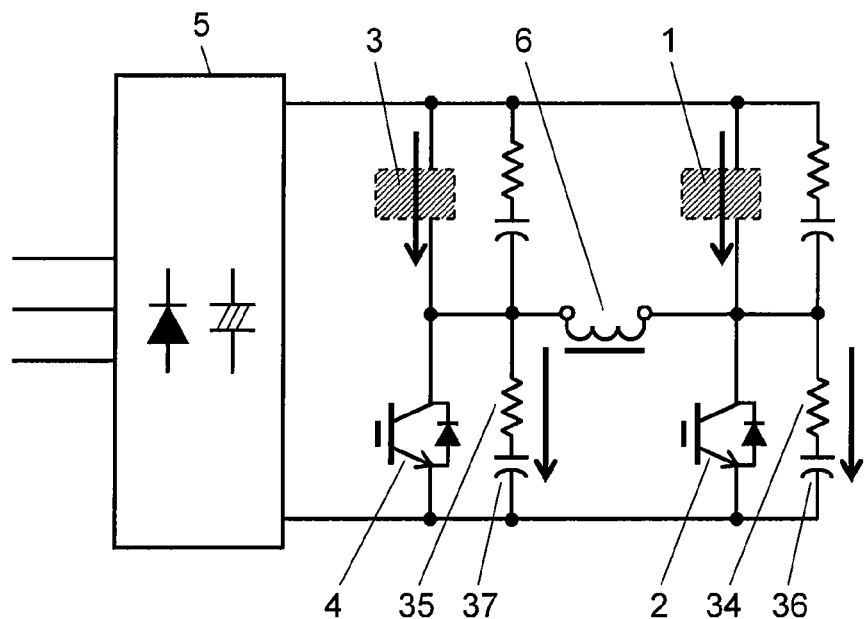
FIG. 9A shows a snubber charge path.
Figure 9B:
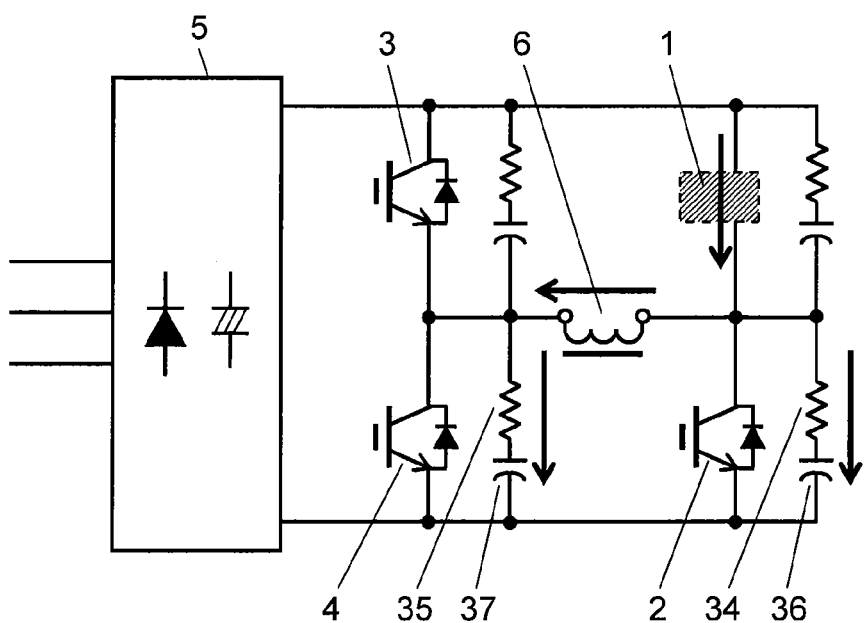
FIG. 9B shows a snubber charge path.
Figure 10A:
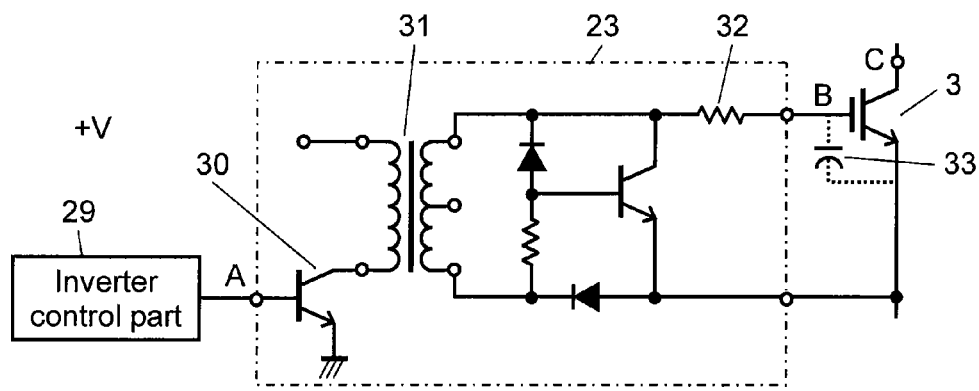
FIG. 10A shows an outline structure of a driving circuit.
Figure 10B:
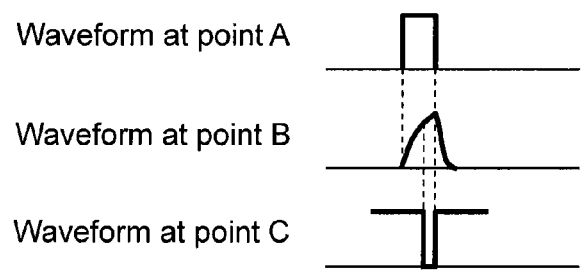
FIG. 10B shows waveforms at some parts of the driving circuit.
Figure 11:
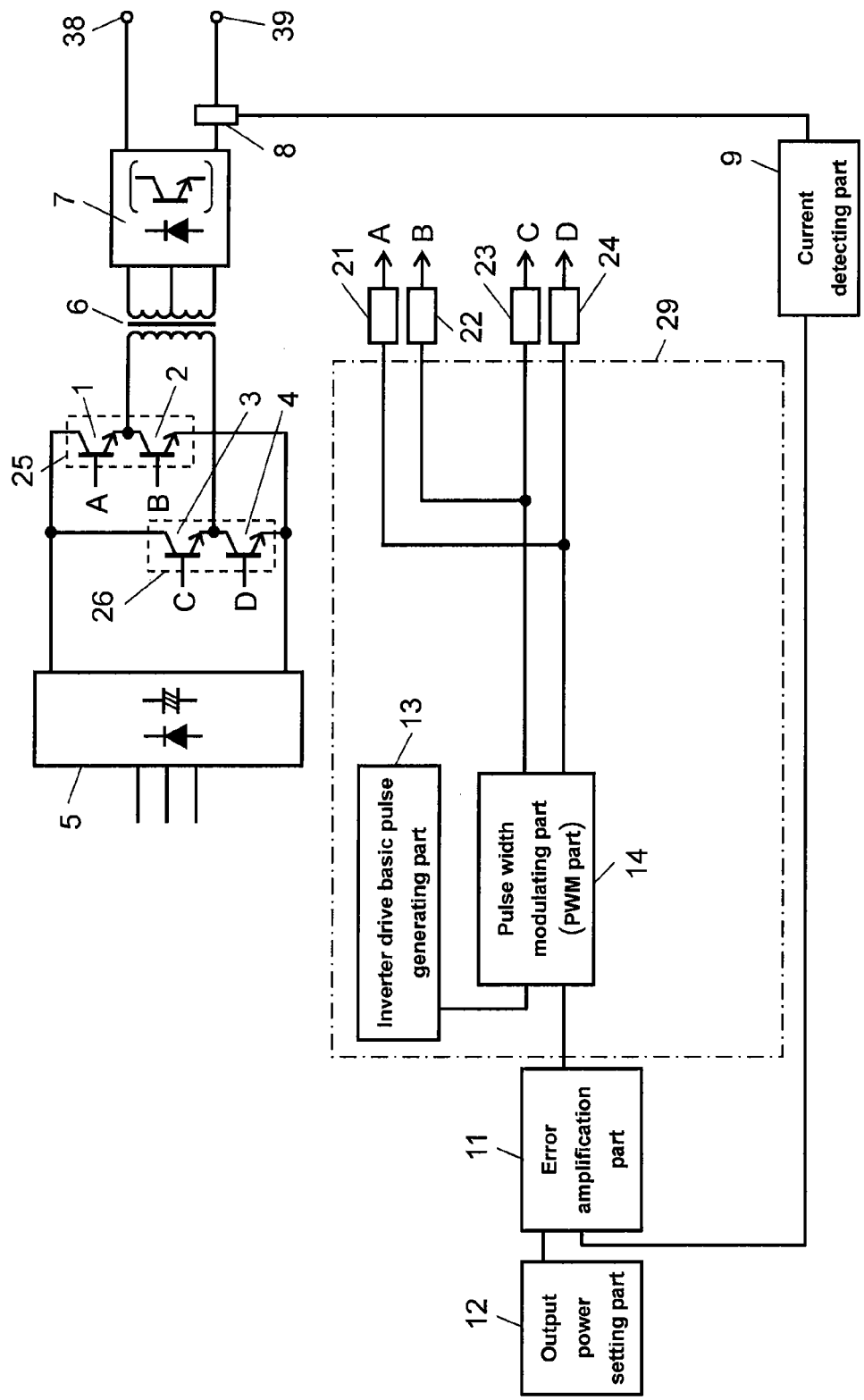
FIG. 11 shows an outline structure of substantial parts of a welding machine by conventional pulse-width modulation.
Figure 12:
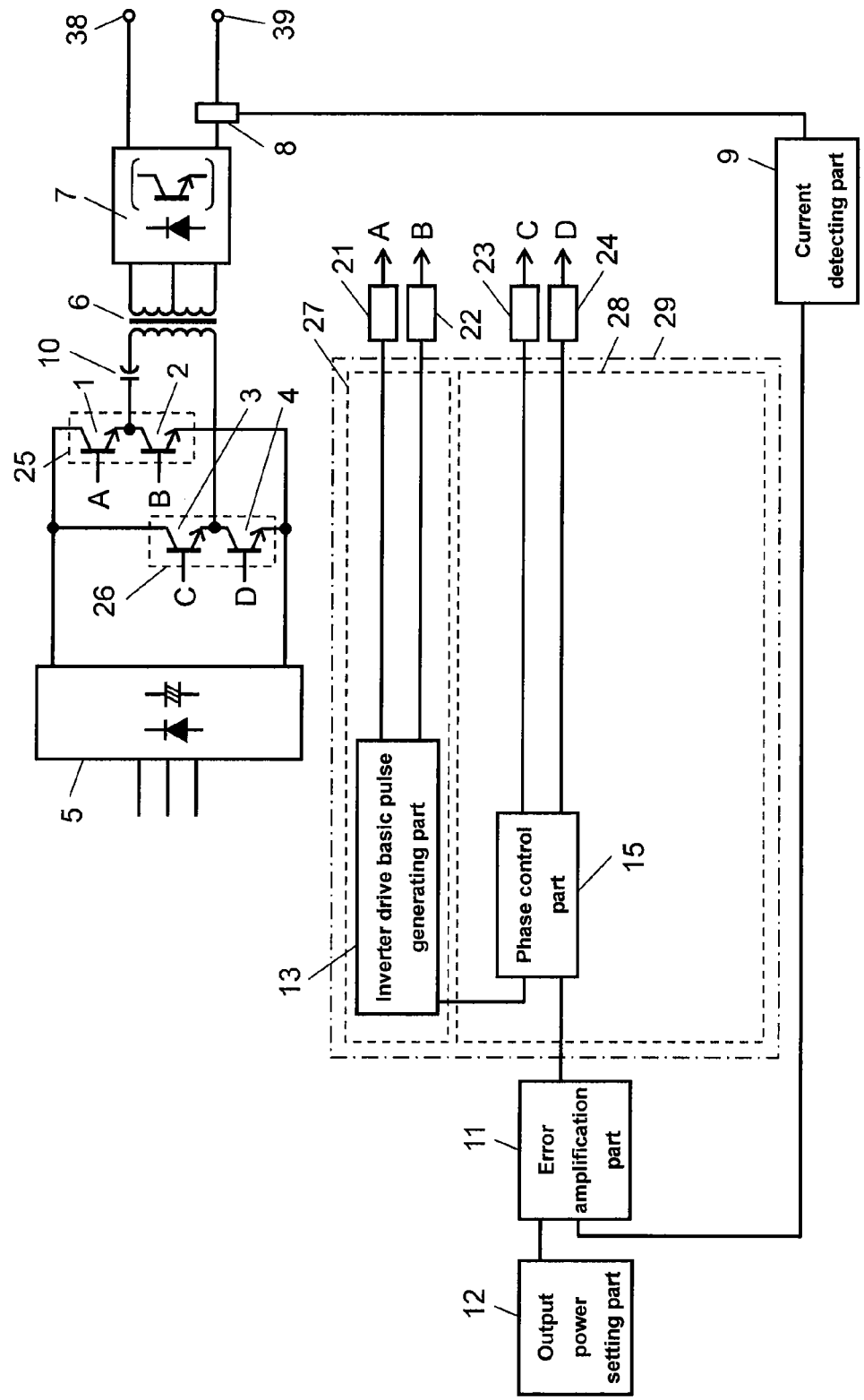
FIG. 12 shows an outline structure of substantial parts of a welding machine by conventional phase control method.
Figure 13:
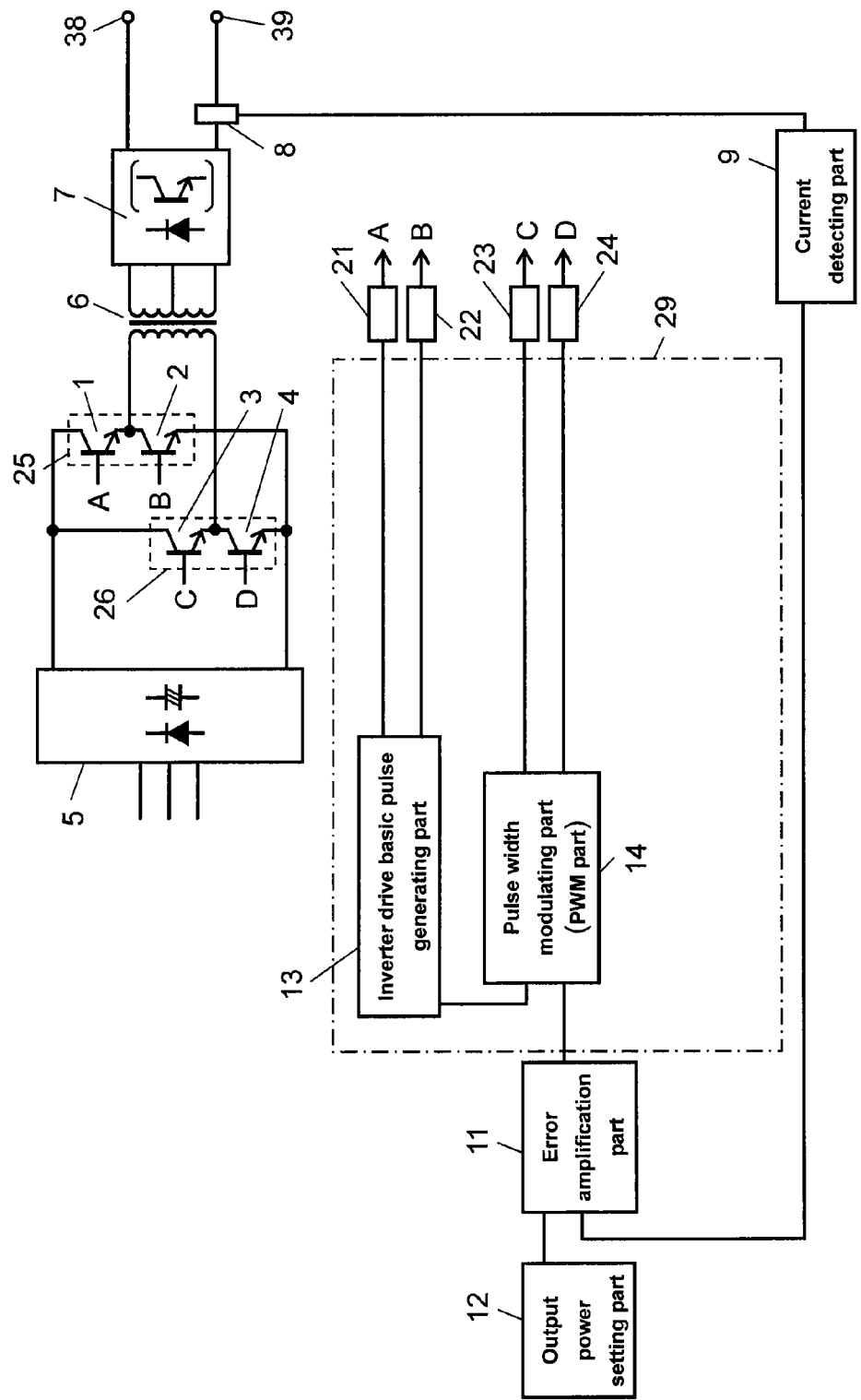
FIG. 13 shows an outline structure of substantial parts of a welding machine by conventional one-side bridge fixed conduction width PWM control method.
Figure 14A:
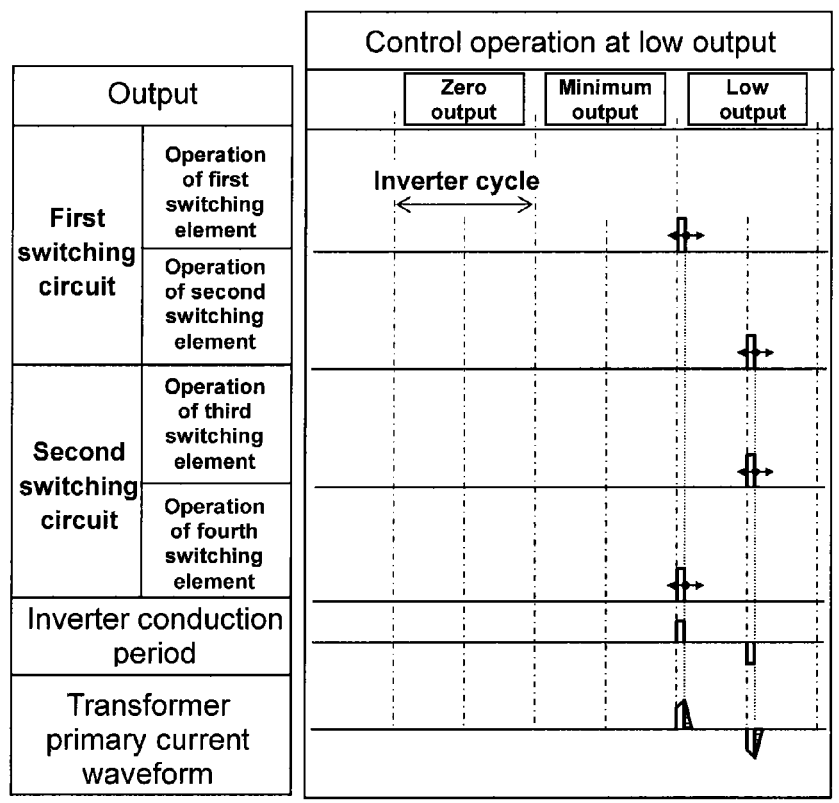
FIG. 14A is a schematic diagram of operation of the inverter of a welding machine by conventional pulse-width modulation.
Figure 14B:
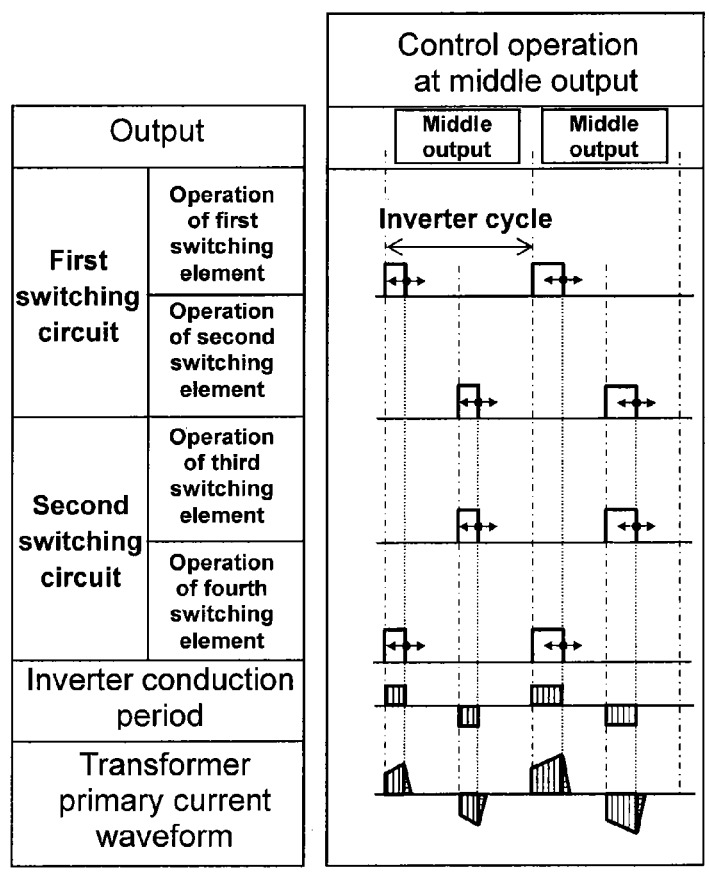
FIG. 14B is a schematic diagram of operation of the inverter of the welding machine.
Figure 14C:
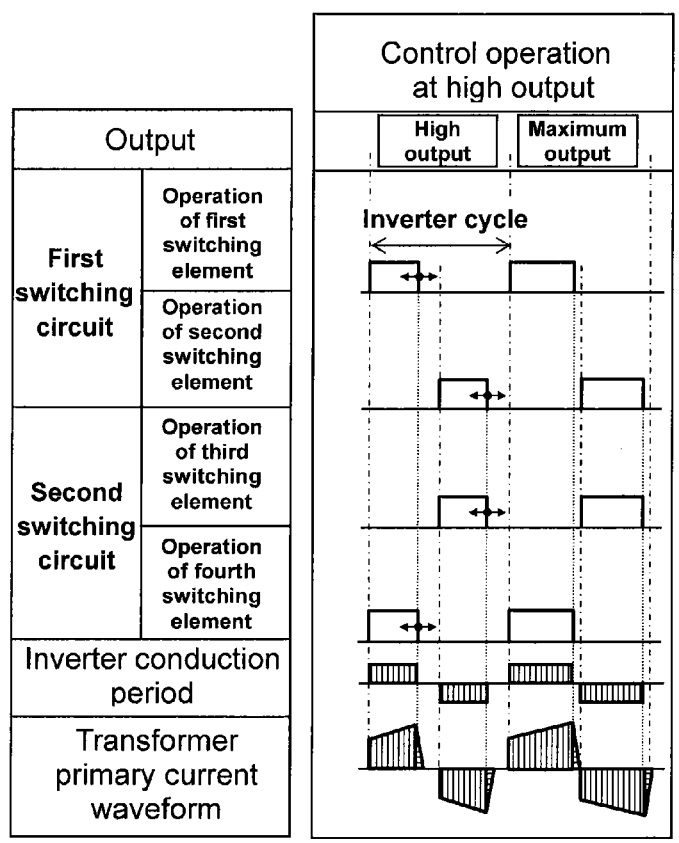
FIG. 14C is a schematic diagram of operation of the inverter of the welding machine.
Figure 15A:
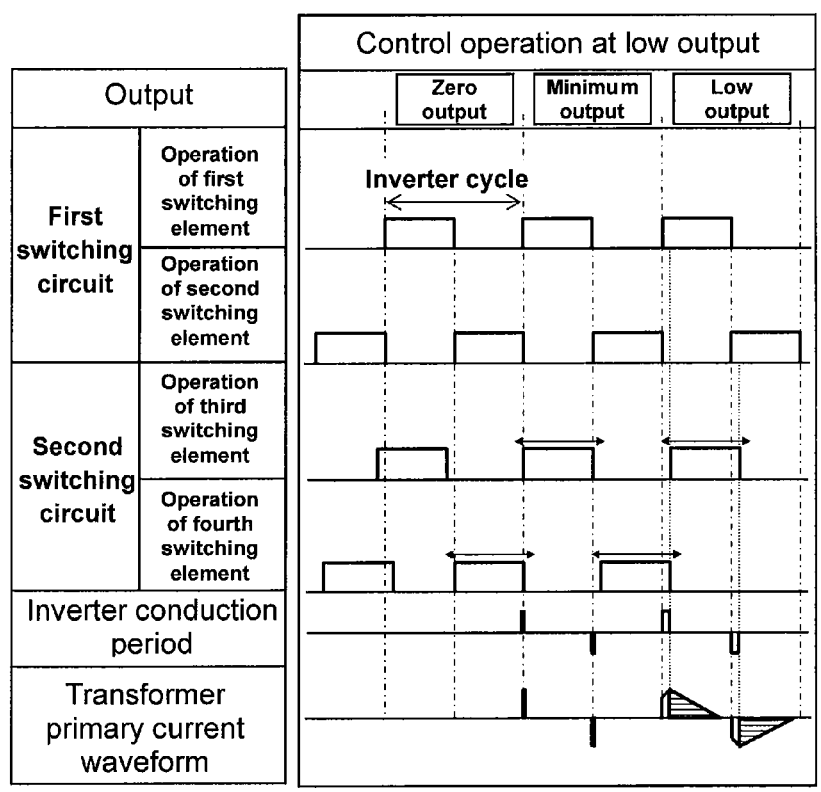
FIG. 15A is a schematic diagram of operation of the inverter of a welding machine by conventional phase control method.
Figure 15B:
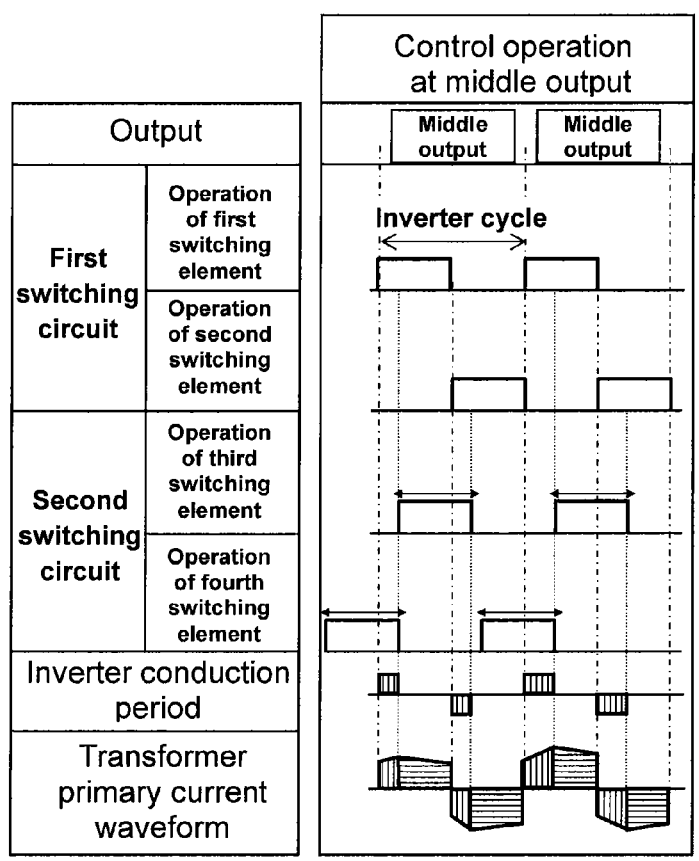
FIG. 15B is a schematic diagram of operation of the inverter of the welding machine by conventional phase control method.
Figure 15C:
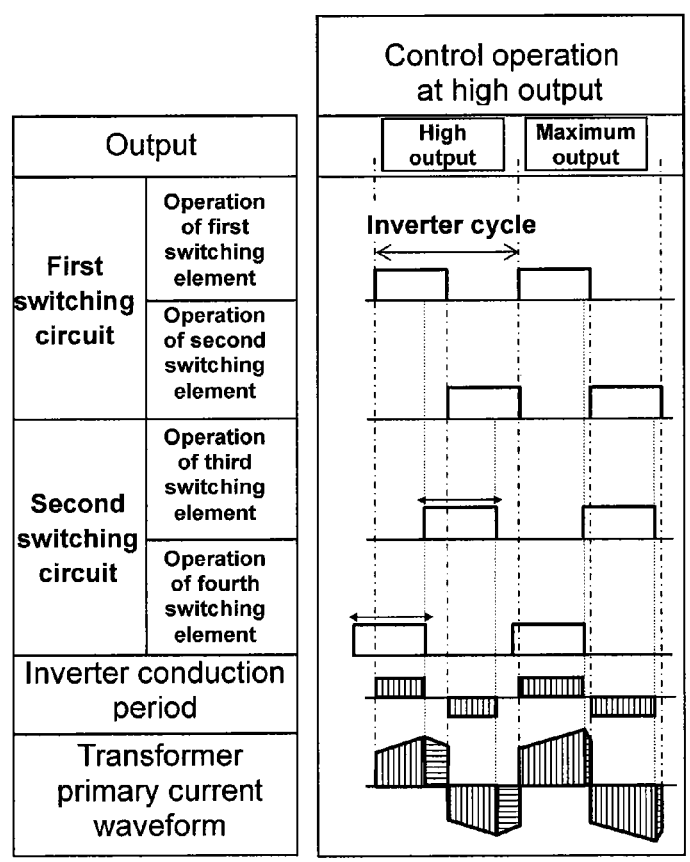
FIG. 15C is a schematic diagram of operation of the inverter of the welding machine by conventional phase control method.
Figure 16A:
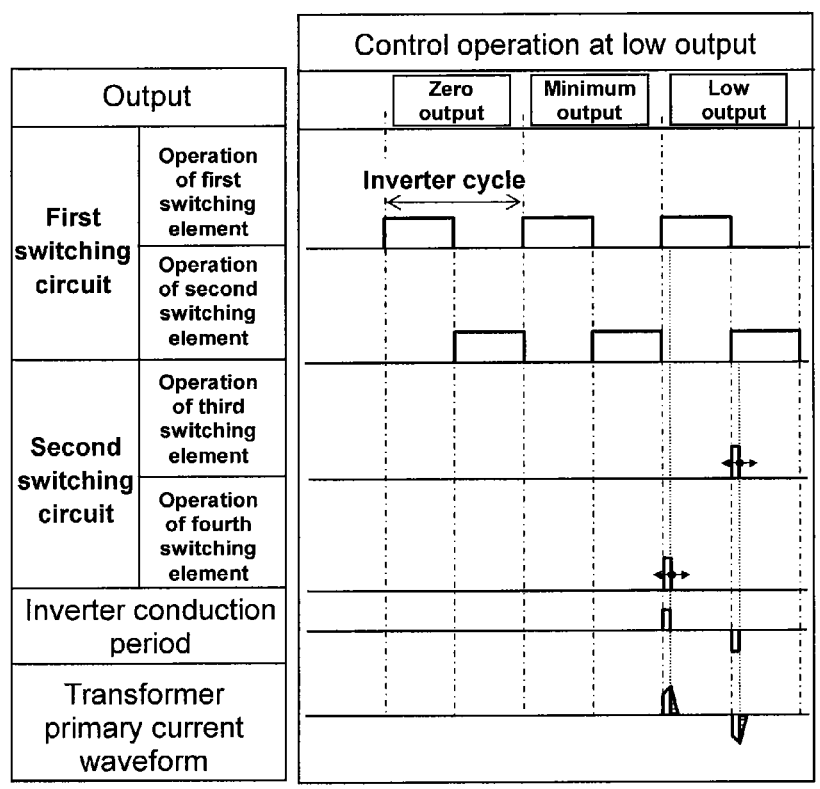
FIG. 16A is a schematic diagram of operation of the inverter of a welding machine by one-side bridge fixed conduction width PWM control method.
Figure 16B:
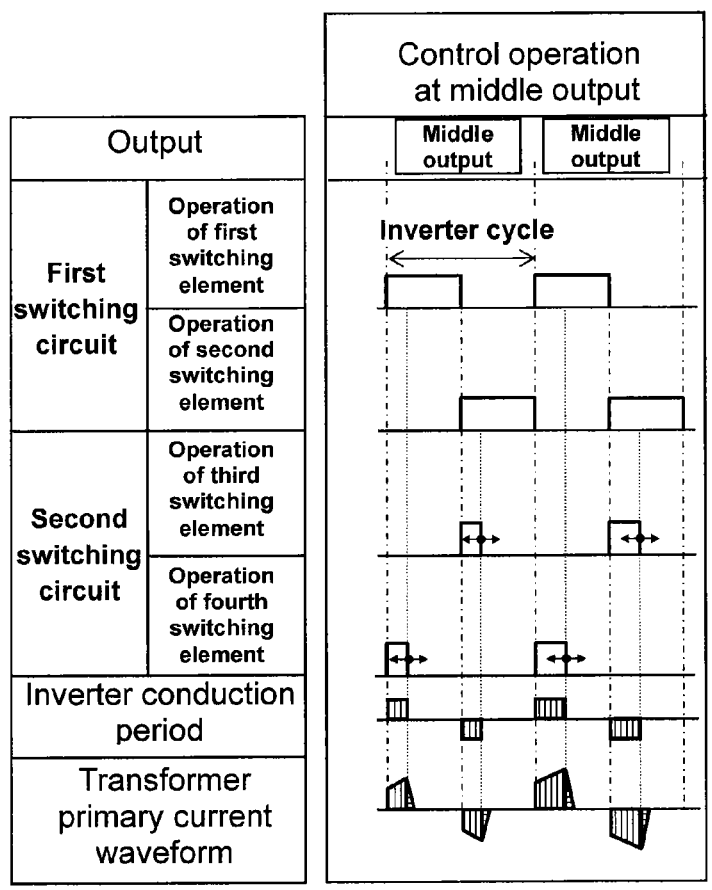
FIG. 16B is a schematic diagram of operation of the inverter of the welding machine by one-side bridge fixed conduction width PWM control method.
Figure 16C:
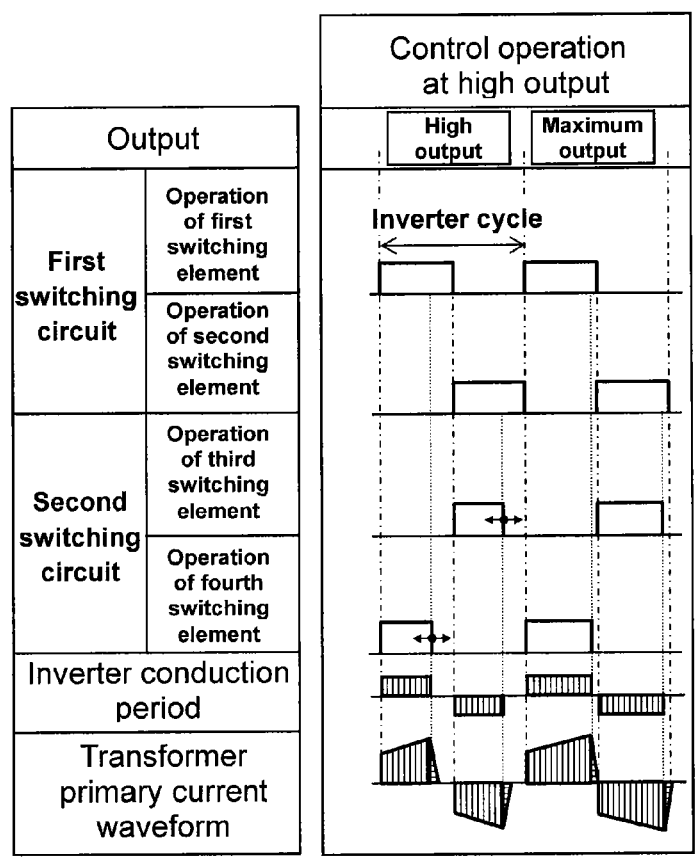
FIG. 16C is a schematic diagram of operation of the inverter of the welding machine by one-side bridge fixed conduction width PWM control method.

A description is made of the inverter control device of an arc welding machine according to the third exemplary embodiment using FIGS. 5 through 7. FIG. 5 shows an outline structure of substantial parts of the inverter control device. FIGS. 6A through 6C schematically illustrate operation of the inverter control device, specifically operation of a switching element, an inverter conduction period, and a waveform of a transformer primary current at low output (FIG. 6A), middle output (FIG. 6B), and high output (FIG. 6C) for welding. FIGS. 7A and 7B illustrate inverter operation, showing changes in operating state. FIG. 7A shows the entire waveform for one cycle. FIG. 7B shows conduction states of the switching elements and operating states of a circuit current in the time areas indicated by T1 through T5 in FIG. 7A.

In FIG. 7A, part L1 surrounded by the solid-line oval indicates that switching loss is generated; and L2 surrounded by the broken-line oval, not generated.

In the third embodiment, a component or portion same as that in the first and second embodiments is given the same reference mark to omit its detailed description.

As shown in FIG. 5, with the inverter control device of the arc welding machine according to the third embodiment, inverter control part 29 includes pulse-width modulating part 14, additional driving pulse generating part 16, and first combining part 40 and second combining part 41 combining output from pulse-width modulating part 14 with output from additional driving pulse generating part 16.

FIGS. 6A through 6C show operating states of the inverter control device according to the third embodiment. FIG. 6A shows an operation state at low output (i.e. a short inverter conduction period); FIG. 6B, at middle output (i.e. middle-range); and FIG. 6C, at high output (i.e. a long inverter conduction period). The figures schematically show conduction states, conduction periods of the inverter circuits; and waveforms of a primary current through the transformer, for first switching element 1 through fourth switching element 4.

In FIGS. 6A through 6C, a part indicated by an arrow, of an operation waveform of first switching element 1 to fourth switching element 4 shows how the waveform changes during output control. An arrow appended at the falling edge (indicated by a black dot) shows that the edge moves back and forth, and the waveform expands and contracts. A horizontally striped part of the waveform of a primary current through the transformer represents a regenerative current.

A description is made of operation of the inverter control device of the arc welding machine structured as the above.

An error amplification signal input from error amplification part 11 to second switching circuit control part 28 is input to pulse-width modulating part 14. Pulse-width modulating part 14 generates driving pulses with a width corresponding to the level of the error amplification signal on a basis of a basic pulse waveform for inverter driving generated by inverter driving basic pulse generating part 13. These driving pulses are separated one by one alternately into two series and are output as 2-series drive signals for inverter driving.

Additional driving pulse generating part 16 outputs a signal for appending driving pulses for a certain period of time immediately before driving pulses output from pulse-width modulating part 14.

Output from additional driving pulse generating part 16 and that from pulse-width modulating part 14 are combined by first combining part 40 and second combining part 41, and are output as a drive signal produced by expanding driving pulses from pulse-width modulating part 14.

This drive signal is converted to a signal suitable for driving third switching element 3 and fourth switching element 4 by third driving circuit 23 and fourth driving circuit 24, and is input to third switching element 3 and fourth switching element 4.

The current converted to an alternating current by the circuit composed of first switching element 1 through fourth switching element 4 is input to the primary winding of transformer 6; is converted to output power suitable for welding; and is output from the secondary winding of transformer 6. Output from the secondary winding is converted to a direct current by second rectifier 7 and is output from the welding machine as welding output power.

FIG. 6A shows control operation at low output. Additional driving pulse generating part 16 adds driving pulses for a certain period of time immediately before driving pulses output from pulse-width modulating part 14. Herewith, driving pulses to second switching circuit 26 are secured for a certain period of time (not zero) even at minimum output and at zero output. As a result, a conduction width determined by driving first switching circuit 25 and second switching circuit 26 changes to zero continuously. This enables controlling a minute current that is difficult to control by pulse-width modulation alone.

FIGS. 6B and 6C show control operation at middle output and high output, and show that second switching circuit 26 is operating with pulse-width modulation in relation to first switching circuit 25.

With the inverter control device according to the third embodiment, a regenerative current reduces at capacitor 10 as shown by a horizontally striped part of a transformer primary current waveform in FIGS. 6A, 6B, and 6C. Accordingly, in whichever state of FIGS. 6A to 6C, a regenerative current reduces steeply. This shows that heat of a switching element generated by a regenerative current can be significantly suppressed.

Setting operation of first switching circuit 25 to near a maximum conduction width results in a transformer primary current being interrupted by third switching element 3 and fourth switching element 4. Herewith, first switching element 1 and second switching element 2 do not interrupt a current, thereby significantly reducing switching loss in first switching element 1 and second switching element 2 to suppress heat generation.

FIGS. 7A and 7B illustrate changes in operating state of the inverter control device of the arc welding machine according to the third embodiment. FIG. 7A shows the entire waveform for one cycle. FIG. 7B shows conduction states of the switching elements and a circuit current in the time areas indicated by T1 through T5 in FIG. 7A.

In FIG. 7A, part L1 surrounded by the solid line indicates that switching loss is generated; and L2 surrounded by the broken line, not generated. In FIG. 7A, first switching element 1 indicated by Q1 does not interrupt a transformer current, and a regenerative current reduces steeply, resulting in no turn-off power loss.

As shown by T3 and T4 in FIG. 7B, a regenerative current is not generated. Then, as shown by the waveform of fourth switching element 4 indicated by Q4 in FIG. 7A, a new drive signal added immediately before point A of the old drive signal causes fourth switching element 4 (indicated by Q4) to start to conduct earlier than first switching element 1 (indicated by Q1). Accordingly, loss while fourth switching element 4 is on can be reduced as well.

As described above, with the inverter control device of the third exemplary embodiment, first switching circuit 25 (i.e. one of the two switching circuits) is driven with a fixed conduction width; second switching circuit 26 (i.e. the other switching circuit) is driven with pulse-width modulation. Besides the above, adding a new drive signal of a short period immediately before the old drive signal enables stabilizing conduction of a switching element at minute conduction.

In other words, an inverter control device according to the third embodiment exercises control by PWM method while adding a drive signal output from additional driving pulse generating part 16 to a drive signal output from pulse-width modulating part 14. Here, if welding output power is near minimum output, pulse-width modulating part 14 outputs an extremely short drive signal. With this arrangement alone, output is unstable as described under Background Art and becomes zero due to such as delay caused by the characteristics of the driving circuit, making difficult to control a minute current well accurately.

Meanwhile, the inverter control device of the third embodiment additionally combines a drive signal output from additional driving pulse generating part 16 with a drive signal output from pulse-width modulating part 14. Herewith, the resulting drive signal is to have a certain length even if pulse-width modulating part 14 outputs a short drive signal near minimum welding output power. Herewith, an output current does not become zero even near minimum output, which enables controlling a minute current.

With the inverter control device of the third embodiment, the description is made of current control using output current detector 8 and output current detecting part 9. Besides, it is obvious that voltage control where the output current detector is replaced with output voltage detecting part 20 follows the same operation.

In the third embodiment, a programmable integrated logic element may be used such as a CPU, DSP, and FPGA as inverter control part 29.

In the first through third embodiments described above, a reactor is serially connected to the primary winding of transformer 6 and capacitor 10, and other capacitors are parallelly connected to switching elements 1 through 4. Herewith, the first through third embodiments can be used in combination with a software switching circuit using a resonance phenomenon.

In the first through third embodiments described above, a drive signal output from inverter driving basic pulse generating part 13 in order to drive first switching circuit 25 has a fixed conduction width. However, if the drive signal turns off with a delay relative to off timing of a drive signal for second switching circuit 26, advantages same as those in the first through third embodiments are obtained. Accordingly, the conduction width of a drive signal output from inverter driving basic pulse generating part 13 may change between off timing of a drive signal for second switching circuit 26 and a maximum conduction width of first switching circuit 25.

Adding a polarity inversion function to second rectifier 7 enables the first through third embodiments described above to be applied to an arc welding machine with AC output.

INDUSTRIAL APPLICABILITY

An arc welding machine of the present invention drives one of the two switching circuits with a fixed conduction width and changes the control method of the other switching circuit between pulse-width modulation, phase control method, and drive signal width control method by phase control method. This implements highly accurate control while suppressing heat generation of a switching element, namely an inverter controlled welding machine with low heat generation and high power efficiency, which also means environmentally friendly and industrially useful.

REFERENCE MARKS IN THE DRAWINGS

1 First switching element
2 Second switching element
3 Third switching element
4 Fourth switching element
5 First rectifier
6 Transformer
7 Second rectifier
8 Current detector
9 Current detecting part
10 Capacitor
11 Error amplification part
12 Output power setting part
13 Inverter driving basic pulse generating part
14 Pulse-width modulating part
15 Phase control part
16 Additional driving pulse generating part
17 Driving pulse width changing part
19 Signal changing part
20 Voltage detecting part
21 First driving circuit
22 Second driving circuit
23 Third driving circuit
24 Fourth driving circuit
25 First switching circuit
26 Second switching circuit
27 First switching circuit control part
28 Second switching circuit control part
29 Inverter control part
30 Transistor
31 Pulse transformer
32 Gate resistance
33 In-gate capacitance
34 Second snubber resistance
35 Fourth snubber resistance
36 First snubber capacitor
37 Second snubber capacitor
38 Output terminal
39 Output terminal
40 First combining part
41 Second combining part

The invention claimed is:
1. An inverter control device comprising:
a first rectifier rectifying AC input;
a first switching element and a second switching element disposed between outputs of the first rectifier, constituting a first switching circuit, series-connected;

a third switching element and a fourth switching element disposed between outputs of the first rectifier, constituting a second switching circuit, series-connected;
a power conversion transformer, one end of a primary winding of which is connected to a junction between the first switching element and the second switching element and another end of the primary winding of which is connected to a junction between the third switching element and the fourth switching element;
a second rectifier rectifying output from the power conversion transformer;
an output power detecting part detecting one of an output current and output voltage from the second rectifier;
an output power setting part for preliminarily setting one of an output current and output voltage;
an error amplification part determining an error between a signal from the output power detecting part and a signal from the output power setting part, and outputting the error; and
an inverter control part outputting a signal controlling operation of the first switching circuit and the second switching circuit according to a signal from the error amplification part,
wherein the inverter control part includes:
a first switching circuit control part outputting a drive signal for alternately bringing the first switching element and the second switching element constituting the first switching circuit into conduction; and
a second switching circuit control part outputting a drive signal for alternately bringing the third switching element and the fourth switching element constituting the second switching circuit into conduction,
wherein the second switching circuit control part includes:
a pulse-width modulating part generating a conduction width that is time during which the third switching element and the fourth switching element are kept in conduction, according to a signal from the error amplification part, and outputting the conduction width;
a phase control part generating conduction time during which the third switching element and the fourth switching element are kept in conduction, the conduction time being a phase difference in relation to conduction time of the first switching element and the second switching element, according to a signal from the error amplification part, and outputting the phase difference; and
a signal changing part accepting a signal from the pulse-width modulating part and a signal from the phase control part, and outputting one of a signal from the pulse-width modulating part and a signal from the phase control part according to a signal from the error amplification part.

2. The inverter control device of claim 1, wherein the signal changing part outputs a signal:
from the pulse-width modulating part if a magnitude of an error amplification signal is within a predetermined first range; and
from the phase control part if the magnitude of the error amplification signal is within a predetermined second range smaller than the first range.

3. An inverter control device comprising:
a first rectifier rectifying AC input;
a first switching element and a second switching element disposed between outputs of the first rectifier, constituting a first switching circuit, series-connected;
a third switching element and a fourth switching element disposed between outputs of the first rectifier, constituting a second switching circuit, series-connected;
a power conversion transformer, one end of a primary winding of which is connected to a junction between the first switching element and the second switching element and another end of the primary winding of which is connected to a junction between the third switching element and the fourth switching element;
a second rectifier rectifying output from the power conversion transformer;
an output power detecting part detecting one of an output current and output voltage from the second rectifier;
an output power setting part for preliminarily setting one of an output current and output voltage;
an error amplification part determining an error between a signal from the output power detecting part and a signal from the output power setting part, and outputting the error; and
an inverter control part outputting a signal for controlling operation of the first switching circuit and the second switching circuit according to a signal from the error amplification part,
wherein the inverter control part includes:
a first switching circuit control part outputting a drive signal for alternately bringing the first switching element and the second switching element constituting the first switching circuit into conduction; and
a second switching circuit control part outputting a drive signal for alternately bringing the third switching element and the fourth switching element constituting the second switching circuit into conduction,
wherein the second switching circuit control part includes:
a pulse-width modulating part generating a conduction width that is time during which the third switching element and the fourth switching element are kept in conduction, according to a signal from the error amplification part, and outputting the conduction width;
a phase control part generating a drive signal of a phase difference in relation to a drive signal from the first switching circuit control part according to the error amplification signal;
a driving pulse width changing part changing a driving pulse width from the phase control part according to the error amplification signal; and
a signal changing part accepting signals from the pulse-width modulating part, from the phase control part, and from the driving pulse width changing part, and outputting one of the signals from the pulse-width modulating part, from the phase control part, and from the driving pulse width changing part, according to a signal from the error amplification part.

4. The inverter control device of claim 3, wherein the signal changing part outputs a signal:
from the pulse-width modulating part if a magnitude of an error amplification signal is within a predetermined first range;
from the phase control part if the magnitude of the error amplification signal is within a predetermined second range smaller than the first range; and
from the driving pulse width changing part if the magnitude of the error amplification signal is within a predetermined third range smaller than the second range.

5. An inverter control device comprising:
a first rectifier rectifying AC input;
a first switching element and a second switching element disposed between outputs of the first rectifier, constituting a first switching circuit, series-connected;

a third switching element and a fourth switching element disposed between outputs of the first rectifier, constituting a second switching circuit, series-connected;

a power conversion transformer, one end of a primary winding of which is connected to a junction between the first switching element and the second switching element and another end of the primary winding of which is connected to a junction between the third switching element and the fourth switching element;

a second rectifier rectifying output from the power conversion transformer;

an output power detecting part detecting one of an output current and output voltage from the second rectifier;

an output power setting part for preliminarily setting one of an output current and output voltage;

an error amplification part determining an error between a signal from the output power detecting part and a signal from the output power setting part, and outputting the error; and an inverter control part outputting a signal controlling operation of the first switching circuit and the second switching circuit according to a signal from the error amplification part, wherein the inverter control part includes:

a first switching circuit control part outputting a drive signal for alternately bringing the first switching element and the second switching element constituting the first switching circuit into conduction; and a second switching circuit control part outputting a drive signal for alternately bringing the third switching element and the fourth switching element constituting the second switching circuit into conduction, wherein the second switching circuit control part includes:

a pulse-width modulating part generating a conduction width that is time during which the third switching element and the fourth switching element are kept in conduction, according to a signal from the error amplification part, and outputting the conduction width;

an additional driving pulse generating part for outputting a drive signal added to a beginning of a drive signal output from the pulse-width modulating part; and a combining part combining output from the pulse-width modulating part with output from the additional driving pulse generating part.

6. The inverter control device of claim 1, further comprising a capacitor serially connected to a primary winding of the power conversion transformer.

7. The inverter control device of claim 1, wherein the inverter control part is formed of a programmable integrated logic element.

8. An inverter control method for a inverter control device including:

a first rectifier rectifying AC input;

a first switching element and a second switching element disposed between outputs of the first rectifier, constituting a first switching circuit, series-connected;

a third switching element and a fourth switching element disposed between outputs of the first rectifier, constituting a second switching circuit, series-connected;

a power conversion transformer, one end of a primary winding of which is connected to a junction between the first switching element and the second switching element and another end of the primary winding of which is connected to a junction between the third switching element and the fourth switching element;

a second rectifier rectifying output from the power conversion transformer;

an output power detecting part detecting one of an output current and output voltage from the second rectifier;

an output power setting part for preliminarily setting one of an output current and output voltage;

an error amplification part determining an error between a signal from the output power detecting part and a signal from the output power setting part, and outputting the error; and an inverter control part outputting a signal controlling operation of the first switching circuit and the second switching circuit according to a signal from the error amplification part, the inverter control method comprising:

a pulse width change controlling step of changing time during which the third switching element and the fourth switching element are kept in conduction, according to a signal from the error amplification part; and a phase controlling step of changing conduction time of the third switching element and the fourth switching element so that the conduction time has a phase difference in relation to conduction time of the first switching element and the second switching element, according to a signal from the error amplification part, wherein the inverter control part performs:

the pulse width controlling step if a magnitude of an error amplification signal is within a predetermined first range; and at least the phase controlling step if the magnitude of the error amplification signal is within a predetermined second range smaller than the first range.

9. The inverter control method of claim 8, wherein the inverter control part performs both the pulse width controlling step and the phase controlling step if the magnitude of the error amplification signal is within a predetermined third range smaller than the second range.

10. The inverter control method of claim 8, wherein the first range and the second range are continuous with each other, and wherein the phase controlling step performed when the magnitude of the error amplification signal is within the second range is performed with a pulse width fixed to a pulse width when the error amplification signal is a minimum within the first range.

11. The inverter control method of claim 8, wherein the inverter control part performs both the pulse width controlling step and the phase controlling step if the magnitude of the error amplification signal is within a predetermined second range smaller than the first range.

* * * * *